(12) United States Patent
Patil et al.

(10) Patent No.: US 11,847,139 B1
(45) Date of Patent: *Dec. 19, 2023

(54) METHODS AND SYSTEMS FOR DATA RESYNCHRONIZATION IN A REPLICATION ENVIRONMENT

(71) Applicant: Veritas Technologies LLC, Santa Clara, CA (US)

(72) Inventors: Rushikesh Patil, Maharashtra (IN); Vishal Thakur, Maharashtra (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,583

(22) Filed: Aug. 29, 2022

Related U.S. Application Data

(63) Continuation of application No. 16/805,292, filed on Feb. 28, 2020, now Pat. No. 11,429,640.

(51) Int. Cl.
*G06F 16/00* (2019.01)
*G06F 16/27* (2019.01)

(52) U.S. Cl.
CPC .................. *G06F 16/273* (2019.01)

(58) Field of Classification Search
CPC ...................................................... G06F 16/273
USPC ....................................................... 707/615
See application file for complete search history.

(56) References Cited

U.S. PATENT DOCUMENTS

| | | |
|---|---|---|
| 5,649,152 A | 7/1997 | Ohran et al. |
| 5,835,953 A | 11/1998 | Ohran |
| 5,875,479 A | 2/1999 | Blount et al. |
| 5,915,098 A | 6/1999 | Palmer et al. |
| 6,073,222 A | 6/2000 | Ohran |
| 6,085,298 A | 7/2000 | Ohran |
| RE37,601 E | 3/2002 | Eastridge et al. |
| 6,728,898 B2 | 4/2004 | Tremblay et al. |
| 6,732,245 B2 | 5/2004 | Kaiya et al. |
| 6,779,093 B1 | 8/2004 | Gupta |
| 7,103,796 B1 | 9/2006 | Kekre et al. |

(Continued)

FOREIGN PATENT DOCUMENTS

| | | |
|---|---|---|
| CN | 109154905 A | 1/2019 |
| JP | 2020047107 A | 3/2020 |
| WO | 2017014814 A1 | 1/2017 |

OTHER PUBLICATIONS

Alferes et al. "Evolution and Reactivity in the Semantic Web." Semantic Techniques for the Web: Lecture Notes in Computer Science. Bry et al., eds. (2009): 161-200.

(Continued)

*Primary Examiner* — Chelcie L Daye
(74) *Attorney, Agent, or Firm* — Campbell Stephenson LLP

(57) ABSTRACT

Methods, computer program products, computer systems, and the like are disclosed that provide for scalable deduplication in an efficient and effective manner. For example, such methods, computer program products, and computer systems can include determining, at a source site, whether metadata has been received from a target site, and, in response to a determination that the metadata has been received at the source site, retrieving the at least one unit of the source data from the source data store using the metadata and sending, from the source site, the at least one unit of source data to the target site.

20 Claims, 14 Drawing Sheets

(56) References Cited

U.S. PATENT DOCUMENTS

| | | |
|---|---|---|
| 7,386,752 B1 | 6/2008 | Rakic et al. |
| 7,987,368 B2 | 7/2011 | Zhu et al. |
| 8,577,850 B1 | 11/2013 | Genda et al. |
| 8,874,508 B1 | 10/2014 | Mittal |
| 9,087,088 B1 | 7/2015 | Bose et al. |
| 9,268,811 B1 * | 2/2016 | Thakur ............... G06F 16/2358 |
| 9,442,806 B1 | 9/2016 | Bardale |
| 9,509,697 B1 | 11/2016 | Salehpour |
| 9,575,789 B1 | 2/2017 | Rangari et al. |
| 9,740,422 B1 | 8/2017 | Ozdemir |
| 10,496,494 B1 | 12/2019 | Haloi et al. |
| 10,592,149 B1 | 3/2020 | Jenkins et al. |
| 2003/0014433 A1 | 1/2003 | Teloh et al. |
| 2003/0061366 A1 | 3/2003 | Musante et al. |
| 2003/0126388 A1 | 7/2003 | Yamagami |
| 2003/0158869 A1 | 8/2003 | Micka |
| 2004/0049365 A1 | 3/2004 | Keller et al. |
| 2007/0185937 A1 * | 8/2007 | Prahlad ................ G06F 16/184 |
| 2008/0279204 A1 | 11/2008 | Pratt, Jr. et al. |
| 2009/0187923 A1 | 7/2009 | McKinney |
| 2010/0070447 A1 | 3/2010 | Pfuntner et al. |
| 2010/0169720 A1 | 7/2010 | Lumpp et al. |
| 2011/0126099 A1 | 5/2011 | Anderson et al. |
| 2013/0054523 A1 | 2/2013 | Anglin et al. |
| 2015/0278395 A1 | 10/2015 | Ben Jemaa et al. |
| 2015/0280999 A1 | 10/2015 | Chart et al. |
| 2016/0306560 A1 | 10/2016 | Maranna et al. |
| 2016/0371007 A1 | 12/2016 | Shani |
| 2017/0286690 A1 | 10/2017 | Chari et al. |
| 2017/0289187 A1 | 10/2017 | Noel et al. |
| 2017/0300244 A1 * | 10/2017 | Crawford ............... G06F 3/0665 |
| 2018/0109425 A1 | 4/2018 | Chart et al. |
| 2018/0225311 A1 | 8/2018 | Bandopadhyay et al. |
| 2018/0227205 A1 | 8/2018 | Bandopadhyay et al. |
| 2018/0285201 A1 | 10/2018 | Bangalore et al. |
| 2018/0295029 A1 | 10/2018 | Shivanna et al. |
| 2019/0138995 A1 | 5/2019 | Currin et al. |
| 2020/0097198 A1 | 3/2020 | Bansal et al. |
| 2021/0157777 A1 | 5/2021 | Yang et al. |
| 2021/0271577 A1 | 9/2021 | Patil et al. |
| 2021/0303408 A1 | 9/2021 | Zhang et al. |

OTHER PUBLICATIONS

Deng et al. "vMerger: Server Consolidation in Virtualized Environment." 2013 IEEE 11th International Conference on Dependable, Autonomic and Secure Computing. (2013): 606-612.

Examination Report issued in European Application No. 18707994.2 dated Sep. 6, 2021.

International Search Report and Written Opinion issued in International Application No. PCT/US2021/015384 dated Apr. 13, 2021.

International Search Report and Written Opinion issued in International Application No. PCT/US2021/015379 dated May 12, 2021.

International Search Report and Written Opinion issued in International Application No. PCT/US2021/024850 dated Aug. 2, 2021.

Patil et al. U.S. Appl. No. 16/836,288, filed Mar. 31, 2020.

* cited by examiner

Replication Operating Process
800

METHODS AND SYSTEMS FOR DATA RESYNCHRONIZATION IN A REPLICATION ENVIRONMENT

CROSS-REFERENCE TO RELATED APPLICATIONS

The present patent application is a continuation of U.S. patent application Ser. No. 16/805,292, filed on Feb. 28, 2020, entitled "Methods and Systems for Data Resynchronization in a Replication Environment," having R. Patil and V. Thakur as inventors, which is incorporated by reference herein in its entirety and for all purposes.

FIELD OF THE INVENTION

The present invention relates to deduplication systems and, more particularly, to methods and systems for data resynchronization in a replication environment.

BACKGROUND

An ever-increasing reliance on information and computing systems that produce, process, distribute, and maintain such information in its various forms, continues to put great demands on techniques for providing and maintaining access to such systems and the data processed thereby. Business organizations can produce and retain large amounts of data. While data growth is not new, the pace of data growth has become more rapid, with the location of data more dispersed, and linkages between data sets more complex. The processing resources needed to effectively manage and process such large amounts of data have experienced an accompanying increase. One approach to addressing such needs is the virtualization of such data processing systems, both in terms of data processing and data storage. Also of importance is the ability of such systems to withstand potential disasters, and provide for the fast, efficient restoration of computing services, while protecting users' data.

Such virtualization is becoming increasingly common. One application of virtualization is the simplification of data center management. In such environments, virtual machines can be used to extend the functional capabilities a host computing devices therein provide. How effective the virtual machines are depends, to a large extent, on the configuration of the virtual machines, and the host(s) on which the virtual machines are implemented. Virtual machines are software constructs that can perform tasks typically associated with physical computing devices. Multiple virtual machines can be implemented on a single physical host, each virtual machine having its own operating system, and can operate independently of the other virtual machines. Thus, virtualization systems can allow multiple operating systems (which can actual be separate instances of the same type of operating system) to execute during the same time period on the same hardware. Each executing operating system acts as an independent "virtual machine" and can be interacted with and used in substantially the same manner as standalone operating system executing on independent hardware. Virtual machines allow increased usage of hardware resources by effectively turning one hardware computing device into several virtual machines.

Some virtualization systems provide a virtualization controller that can manage one or more virtual machines implemented on one or more computing devices. Such a virtualization controller can communicate with the virtual machines and control the operation of those virtual machines. In some environments, the virtualization controller can manage the virtual machines in a manner that provides high availability of the virtual machines, such that if a particular virtual machine experiences a failure, the virtualization controller can restart that failed virtual machine on another computing device.

As will be appreciated, today's organizations often rely extensively on data maintained online. Such frequently-accessed, constantly-changing data can be critical to the ongoing operations of such organizations. Unplanned events that inhibit the availability of this data can seriously affect business operations. Additionally, any permanent data loss, from natural disaster or any other source, will likely have serious negative consequences for the continued viability of a business. Therefore, when disaster strikes, organizations must be prepared to eliminate or minimize data loss, and recover quickly with useable data. Data backup can be used to prevent data loss in case of any such disaster. A data backup process typically creates copies of original data. These copies can be used to restore the original data after a data loss event. The backed-up data can be stored using a variety of media, such as magnetic tape, hard drives, and/or optical storage, among others. Various techniques can be used to generate such backups, such full backups, incremental backups, or differential backups, among others. In case of a failure, then, such online data processing systems should provide fast, easy, efficient functionality for recovering from such disasters.

SUMMARY

The present disclosure describes methods, computer program products, computer systems, and the like are disclosed that provide for scalable deduplication in an efficient and effective manner. Such methods, computer program products, and computer systems include determining, at a source site, whether metadata has been received from a target site, and, in response to a determination that the metadata has been received at the source site, retrieving the at least one unit of the source data from the source data store using the metadata and sending, from the source site, the at least one unit of source data to the target site. The source site is a source for a replication operation, the target site is a target for the replication operation, the replication operation replicates one or more units of source data stored in a source data store at the source site, to a target data store at the target site, the metadata comprises information regarding a data structure, the data structure identifies at least one unit of the source data that the source site is to provide to the target site as a result of one or more write operations having been executed on a target data store at the target site, and the at least one unit of source data is other than the one or more units of source data.

In certain embodiments, the data structure can comprise an active data structure. In such embodiments, the method can include generating a combined data structure by combining the active data structure and a synchronization data structure, where the synchronization data structure is maintained at the source site. In such embodiments, the sending sends the combined data structure from the source site to the target site. In such embodiments, the method can include receiving the at least one unit of source data at the target site and overwriting the one or more units of data with at least one unit of data of the combined data structure.

In yet another embodiment, the method can further include causing a source data mover at the source site to perform a synchronization operation, in response to the determination that the metadata has been received at the source site. In such embodiments, the overwriting can be performed prior to initiation of the replication operation or as part of the replication operation.

In another embodiment, the determining, retrieving, and sending are performed as a result of at least one of a failover operation or a failback operation. In such embodiments, the metadata can be received as a result of initiation of the replication process. The metadata can further comprise a logical block number, a size, and a physical block number.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
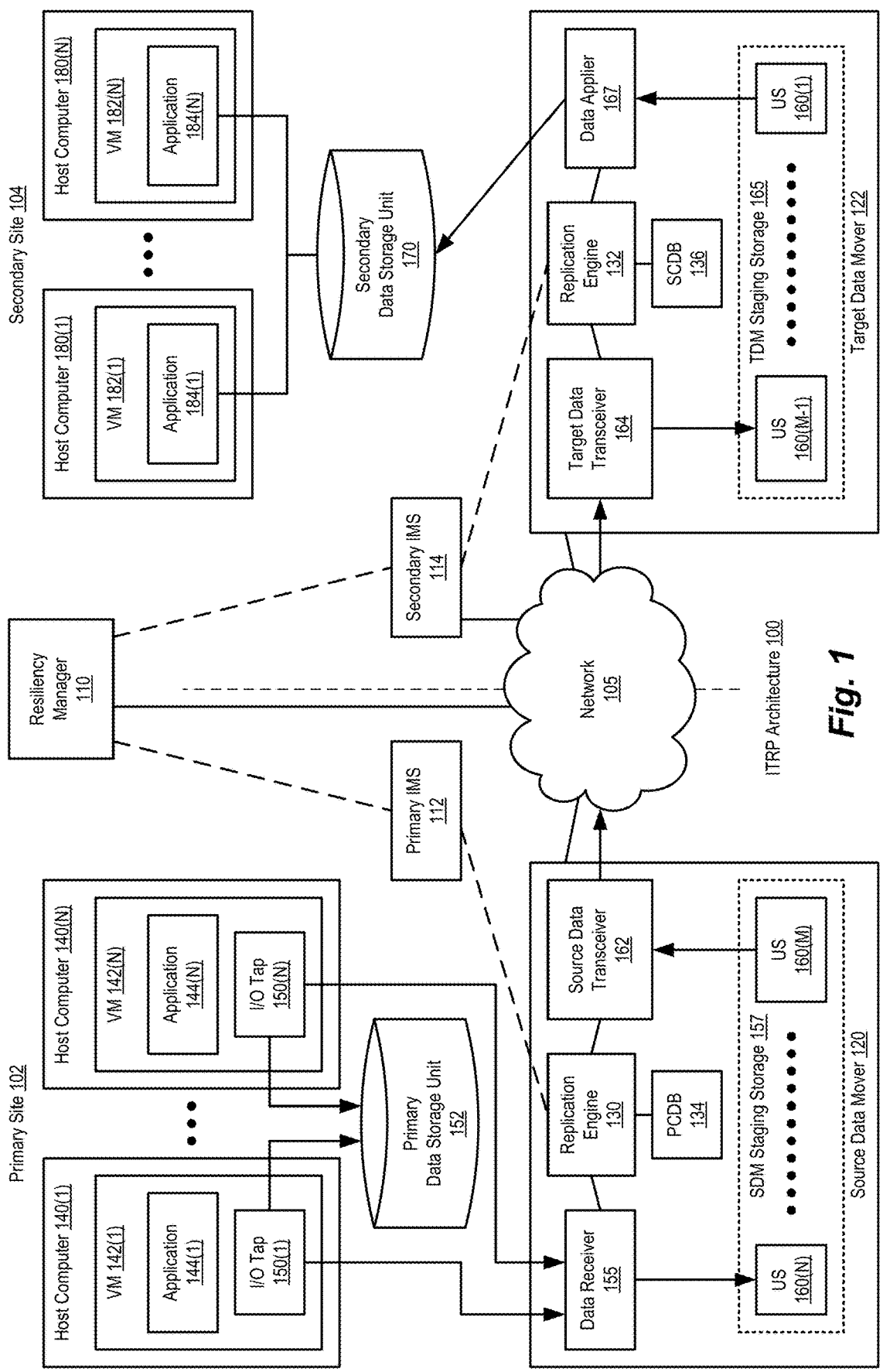
FIG. 1 is a simplified block diagram illustrating an example of components of an information technology resiliency platform architecture, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

Introduction

Methods and systems such as those described herein provide for data resynchronization in a replication environment, in situations in which write operations are performed in error (e.g., as a result of a failure in boot-up procedures after a failover/failback, a power failure during synchronization, intentional tampering, or other circumstances in which write operations are erroneously executed on a target data store (the data store to which write operations to a source data store are to be replicated). Such methods and systems facilitate such resynchronization by implementing mechanisms that track write operations executed on a target data store during situations in which such data is not be written, in order to maintain synchronization with an associated source data store (such erroneous write operations therefore being erroneous), and overwrite the resulting data with the correct data from the associated source data store. Embodiments such as those described herein also provide for the detection of such situations, by way of analysis of the data structure(s) used to record such write operations (e.g., as by determining whether a data structure such as a bitmap is cleared, or, in the alternative, indicates the occurrence of one or more such write operations).

Such an architecture avoids a number of problems that would otherwise result from such erroneous write operations. As will be appreciated, such events cause the target data store in question to be out of synchronization with a starting point of its associated source data store. As will also be appreciated, such synchronization should be maintained in replication architectures such as those employing an information technology resiliency platform (ITRP; e.g., VERITAS RESILIENCY PLATFORM). An ITRP can address a number of disaster recovery (DR) use cases, allowing users to migrate and recover their organization's digital assets, maintain system functionality and availability in the face of such disasters, and support other such functions. An ITRP such as that described herein can use standalone replication (SR) to move data from one site (e.g., a primary site) to another (e.g., a secondary site), in an ongoing fashion. In so doing, a user's (or organization's) data is typically replicated from such a primary site to the secondary site. However, while the ability of such ITRPs to support failover/failback of an organization's computing resources (e.g., in the face of a disaster and its resolution), such replication processes and systems are not immune from failures or other problems during their operation.

Thus, unfortunately, during such failover and failback operations (as well as other events such as power failures during replication operations, intentional tampering, and the like), it is possible for erroneous write operations to be executed on a target data store (a data store at a target site) and, as a result, cause such a target data store to become unsynchronized with the original state of its associated source data store. Further, such loss of synchronization can occur in a manner that may not be detected by the ITRP due to the expectation that the target data will remain unchanged (having been disconnected), which is often exacerbated by the organization's control over computing resources and lack of access by ITRP processes. Thus, mechanisms to detect the occurrence of such events are needed, given that, while replication is under the control of components of an ITRP such as that described herein, acts performed by users and unexpected events are not.

One solution to the problems presented by such situations is to make the computing resources and/or data consistent once again by manually performing the requisite steps needed to perform a full resynchronization, using facilities provided by the ITRP. However, as will be appreciated, such full synchronization involves the transfer of all data and other information regarding the computing resource and/or data from the primary site to the secondary site. Clearly, in terms of computing, network, and storage resources involved, as well as time and human resources, such a full resynchronization is inordinately expensive. Further still, a mechanism for detecting the occurrence of such events would still be needed. And even then, such full resynchronizations would remain at risk for failures while being conducted.

In light of the foregoing, methods and systems such as those described herein provide mechanisms for automatically detecting circumstances giving rise to erroneous write operations (e.g., actions taken by users, failures, or the like), for example, in an ITRP or other replication environment. Further, such methods and systems provide for the synchronization/resynchronization of data and its replicated counterpart in an effective, efficient manner.

As will be described in greater detail subsequently, methods and systems such as those described herein employ the use of write tracking. For example, in one implementation, an input/output (I/O) tracker ("I/O tap") that records information regarding write operations performed by a given computing resource (e.g., a virtual machine) is employed to track write operations in the data modified thereby. Such an I/O tap can be implemented, for example, as a filter driver in the VM in question (also referred to herein as an in-guest filter driver (I/O tap)). As will be discussed subsequently, such filter drivers can also be implemented as part of a host operating system and/or a temporary operating system. Such an ITRP architecture also employs one or more data movers at the primary site and one or more data movers at the secondary site. Such data movers, when sending replicated data, are referred to as source data movers. Alternatively, when receiving replicated data, such data movers are referred to as target data movers. In one embodiment, such data movers are implemented as replication appliances deployed on both sites. In such an embodiment, such data movers, as their name implies, move data from one site to the other. As will also be appreciated, given that either of two sites can act as the source site or the target site, mechanisms and processes such as those described herein apply equally to failover and failback scenarios (as the "source" and "target" systems are thus denoted based on the direction in which the original data is replicated).

In one embodiment, such filter drivers maintain one or more data structures (e.g., such as bitmaps) to facilitate the synchronization of data and track active I/O operations (e.g., write operations on a per disk basis). In one embodiment, employing bitmaps, such bitmaps are maintained on a separate storage unit (referred to herein as a dirty region logging (DRL)) disk, and so, provides for the tracking of units of data that have been changed by write operations (and so, are considered "dirty" (changed)). A synchronization bitmap is used to synchronize data (as between the primary site and the secondary site) upon startup or initialization, while an active bitmap is used for tracking application writes during normal replication operations. Further, in certain embodiments, a filter driver implemented in a host or temporary operating system can write to a synchronization bitmap, in order to provide for the tracking of right operations performed at the host or temporary operating system level.

In one scenario (in which the primary site is the source of the original data to be replicated), data at the primary site corresponding dirty/set bits are sent to the primary site's source data mover. The source data mover accumulates changed data and associated metadata over a period of time, and can do so in a file referred to herein as an update set (US). The USs are sent to the target data mover, which in turns unpacks the data sent and writes that unpacked data to the target replication disks. The USs, in one embodiment, include metadata and data. In one embodiment, such metadata includes entries that represent form factors of the data in the US (e.g., such as the location in the update set, the size, and the location in storage of a given amount of data). Such information can include, for example, the logical sector of the replication storage unit at which the given amount of data begins, the physical sector in the US's files at which the given amount of data begins, and amount of data in question. Such metadata can also include verification information (e.g., a checksum, hash, or other such information), in order to maintain data integrity.

In implementing methods and systems such as those described herein, such approaches provide a number of advantages. For example, such approaches are able to detect circumstances leading to data at a target site being or becoming unsynchronized with respect to initial data at a secondary site, and can take steps to synchronize/re-synchronize such target data as part of replicating source data from the source site. Similarly, such approaches can provide such functionality without regard to the cause of such discrepancies. Further, by way of support for filter drivers implemented in host and temporary operating systems, such situations can be addressed without the need for such tracking in the hypervisor employed (i.e., making such approaches vendor-agnostic with regard to such hypervisors). And, with respect to failover/failback, such approaches can be used regardless of the direction of replication (e.g., in situations in which the primary site is active (and so, the flow of data replication is from the primary site to the secondary site), and also in situations in which the secondary site is active (and so, the flow of data replication from the secondary site to the primary site)).

Thus, methods and systems such as those described herein are thus able to address a variety of circumstances in which a data replication process encounters a situation in which a target data store is erroneously subject to one or more right operations. Such approaches automatically detect such situations, in a vendor-agnostic manner, and provide for the correction of any resulting data inconsistencies (e.g., as part of a failover or failback operation). In addition to the aforementioned advantages, architectures according to embodiments such as those described herein provide a number of other benefits, as will be appreciated from the following description.

Example Architectures Providing Data Resynchronization

Systems such as those described herein provide methods and systems for maintaining data consistency across the failure and recovery of infrastructure, as when performing failover and failback in disaster recovery environments. Such maintenance of data consistency can be achieved, for example, in an environment in which an Information Technology Resiliency Platform (ITRP), according to methods and systems such as those described herein, is implemented. Such an ITRP can provide not only for disaster recovery, but also provide workload management capabilities for virtual machines, as well as various applications, such as those which might be executed on a desktop computer platform. In so doing, such an ITRP architecture provides a system for managing IT applications for numerous resiliency capabilities in various forms, with such solutions providing for, e.g., disaster recovery and workload management. An ITRP architecture according to methods and systems such as those described herein provides a scalable, distributed, and layered architecture with the potential to add new capabilities to the platform on demand. Such an architecture leverages automatic/assisted discovery of IT assets to reduce administrator configuration errors. Further, such an approach can facilitate remote agent capabilities to maintain the IT policies associated with therewith. An ITRP architecture according to methods and systems such as those described herein leverages workflows in a novel manner to provide customization and extensibility to the solution.

An ITRP according to methods and systems such as those described herein also provides for the management of virtual machine (VM) configuration. Such VM configurations are associated both with VMs that are to be provisioned on (and so be hosted on) a node, as well with VMs that are already being hosted by such nodes. A VM configuration can include one or more resource requirements as well as one or more additional requirements. Resource requirements indicate one or more resources that are needed in a node for hosting this VM. Additional requirements indicate one or more operational elements needed in a node for hosting this VM. This VM configuration is compared to configurations of various clusters. The cluster configuration can indicate configuration information for node(s) of that cluster. This comparison can be used to select a cluster that includes nodes that can meet the resource and the additional requirements for hosting this VM. A VM can be provisioned based on a service level agreement (SLA) associated with that VM. An SLA can include various resource requirements such as physical requirements of a node where that VM is provisioned. These resource requirements can include CPU, memory, and other hardware requirements. As a result, the VM is provisioned on a server that has the resources specified by the resource requirements of the SLA associated with that VM.

Methods and systems such as those described herein can be delivered in the form of one or more virtual appliance(s), for example. In certain embodiments, each instance of such a virtual appliance is deployed in three modes:
1. Resiliency Manager (RM) mode only
2. Infrastructure Management Service (IMS) mode Only
3. "RM and IMS" mode (where a combination of these modes is enabled; which can be configured as a default mode, in certain embodiments)

An RM (Resiliency Manager) according to embodiments of systems such as those disclosed herein presents a centralized management functionality, which, in certain embodiments, includes two-layered set of services. In such embodiments, a "bottom"/core layer thereof can be provided that includes services such as a database service, a messaging service, a communication and data façade service, a workflow service, authentication and authorization services, logging and auditing services, and the like, among other such functions and services. Also in such embodiments, a "top"/business layer can be provided that can include, for example, a workload management service, a recovery automation service, a reporting service, and the like, among other such services.

An IMS (Infrastructure Management Service), according to methods and systems such as those described herein, provides a distributed management functionality, which, in certain embodiments, can also include a two-layered set of services. In certain embodiments, the "bottom"/agent layer provides the ability to discover, monitor and operate on supported hardware elements (example—a storage array) and software elements (example—a database (DB) and/or database management system (DBMS) instance(s)). In certain embodiments such as the foregoing, the "top"/aggregator layer provides the ability to provide consolidated summary of discovered assets, uniform operational layer and a persistent state for supported hardware and software elements.

As noted, in an architecture according to methods and systems such as those described herein, the replication services provided by such architectures facilitate failover and failback operations, in which VMs can be migrated from one site (e.g., a primary site or secondary site, respectively) to another site (e.g., a secondary site or a primary site, respectively). As part of such failover/failback operations, the site from which such operations proceed becomes the target site, and that to which such operations proceed to becomes the source site. Typically, the (now) target site will have its data (the target data) preserved by disconnecting the virtual disks (VMDK) storing such data. However, it will be appreciated that the physical storage systems, in which such VMDKs are stored, are not physically disconnected from the physical computers to which they are coupled.

At this juncture, if the VM/its data is restored, the replication solution employed (e.g., the ITRP) risks being unaware of write operations (erroneously) executed on the target data store, as noted. Such erroneous write operations can thus result in the target data store becoming unsynchronized with respect to the original state of the (now) source data store. In such a case, given the replication solution's lack of awareness as to the resulting lack of synchronization (e.g., without approaches such as those described herein, the ITRP has no way of determining the present state of the computing resources to which the source data is now being replicated), the replication solution would not take steps to synchronize the target data store with the source data store data, in the normal course of operations (with regard to the data changed by the erroneous write operations).

However, using methods and systems such as those described herein, such situations can be detected (e.g., as by a determination based on information recorded by the computer systems of the target site) and corrected (e.g., as by identifying changes to data at the source site needing to be applied to data at the target site). In order to address such issues, methods and systems according to the present disclosure automatically detect and correct such discrepancies.

In general terms, operations such as the following provide an example of a method according to the present disclosure that can be employed to automatically detect and correct data inconsistencies resulting from erroneous write operations occurring at a target site.

For example, a physical computer system (sometimes referred to as a "bare metal" computer system) can be protected by an ITRP such as that described herein. In such a scenario, data and other information processed and stored by the physical computer system is replicated from its primary site, to a secondary site. At this stage, the replication is from the primary site (source site) to the secondary site (target site). In the case of failover, in which processes executed by the physical computer system are failed over (migrated) to the secondary site, replication will be in the opposite direction, with the secondary site acting as the source site, and the primary site acting as the target site.

Once the migrated processes (also referred to herein as instances) are executing at the secondary site, it will be desirable prepare the computing resources (also referred to herein as infrastructure) at the primary site to perform a failback operation at some point in the future. If the physical machine is initialized ("powered on") during maintenance mode (a state in which the physical machine may be operated for debugging purposes, or is powered on accidently), application write operations may occur and cause inconsistency between the target and source sites. Even if such events were detected, the only way to address such situations would be to perform a full resynchronization of data from the source site to the target site again, with all the disadvantages noted earlier.

In one embodiment, a filter driver is installed in each protected machine. Thus, when the machine is booted, the filter driver is initialized and begins tracking any write operations performed. This filter driver maintains information in a data structure (e.g., a bitmap data structure) stored in a storage unit referred to herein as a "dirty region log" (DRL) storage unit (indicating data having been "dirtied" (written to or otherwise changed), and so provides bookkeeping for all such write operations.

Such can also be the case for a temporary operating system, such as that as might be loaded by way of a pre-boot execution environment (PXE). In such a scenario, the physical storage system (or physical storage unit) is exposed over a network, for example, to a data mover at the source site. This involves handshake communications between the physical computer system and the data mover for its site. The fiscal computer system sends a request for a network address (e.g., an Internet Protocol (IP) network address via a Dynamic Host Configuration Protocol (DHCP) request), and a PXE request (in order to load the environment it will use in booting itself). When using PXE, the physical computer system loads a temporary operating system by way of PXE. However, such operations can encounter failures, thereby leading to the computer system in question being in an unknown state, from the perspective of the ITRP, and can result in erroneous write operations resulting from such systems automatically booting, for example. Further, in such an event, user actions (e.g., powering on a physical computer system) can result in erroneous write operations.

In embodiments such as those described herein, this temporary operating system can include a filter driver, in order to capture and record erroneous write operations, in the manner described. Further in this regard, it will be appreciated that filter drivers in a guest operating system, a host operating system, and/or a temporary operating system can coexist with one another, and update a single common data structure, multiple data structures, and/or data structures specific to each (which can then be combined and sent to the source site subsequently, or sent to the source site individually, for further processing there).

Such data structures can then be used in obtaining data from the source site that can be used to synchronize the erroneously changed data on the target site. To that end, the DRL attached to the protected machine during maintenance mode. In the case in which this machine is erroneously initialized during maintenance mode, the filter driver(s) can track application writes and update corresponding entries in the DRL. Once the ITRP is ready to initiate replication from the source site (secondary site, in this example) to the target site (primary site, in this example), the data mover at the primary site can read these data structures from the DRL and make requests of the secondary site (the (now) source site) to resend the data indicated by the data structure(s). In so doing, only the data needed to bring the target data store into synchronization is sent from the source site to the target site. As will be appreciated, such an approach provides significant improvements in efficiency (in terms of time and resources) over a full resynchronization of the target data store with the source data store.

A simple, generalized process can be described as follows:

a. The migrated instance is operational on secondary site. ITRP powers off the protected instance on the primary site to maintain consistency.

b. In this example, reverse replication has not been initialized, or some difficulties in setting up reverse replication for the ITRP (e.g., PXE boot of a physical computer system might encounter network issues). Alternatively, a user may have inadvertently powered on a protected computing system at the primary site, which the ITRP might not detect.

c. The filter driver(s) will have been initialized as a result of the guest operating system, host operating system, and/or temporary (maintenance) operating system having been booted, and will track write operations performed by applications, maintaining the requisite data structures in view thereof.

d. Once the protected computer system is operational and the infrastructure is ready for replication to commence, the requisite data structure(s) is (are) sent to the migrated instance executing at the secondary site.

e. The migrated instance, having received the requisite data structure(s), sends source data corresponding thereto, to the target site, for overwriting of the affected data.

A more detailed description of such methods is now provided in connection with a discussion of the figures.

FIG. 1 is a simplified block diagram illustrating an example of components of an information technology resiliency platform architecture, according to one embodiment. FIG. 1 thus illustrates an ITRP architecture 100. ITRP architecture 100, as an example of possible components of an ITRP and the relationships therebetween, includes various computing resources at a primary site 102 and a secondary site 104, which are in communication via a network 105. As noted earlier, an ITRP such as that depicted as ITRP architecture 100 provides a resiliency manager 110 that orchestrates the ITRP by communicating with various infrastructure management services (depicted in FIG. 1 as a primary IMS 112 and a secondary IMS 114), which, in turn, communicate with the replication engines of the data movers depicted therein. More specifically, primary IMS 112 communicates with the components of a source data mover 120, while secondary IMS 114 communicates with the components of a target data mover 122. More specifically still, primary IMS 112 communicates with a replication engine 130 of source data mover 120, while secondary IMS 114 communicates with a replication engine 132 of target data mover 122.

Source data mover 120 provides replication services to the computing resources of primary site 102, replicating data at primary site 1022 secondary site 104 by replicating the data resulting from write operations to secondary site 104 by way of communications with target data mover 122 via network 105. In addition to replication engine 130, source data mover 120 provides a primary configuration database 134, while target data mover 122 maintains replication configuration information in a secondary configuration database 136.

In operation, ITRP architecture 100 provides a number of host computers (depicted in FIG. 1 as host computers 140(1)-(N), and referred to in the aggregate as host computers 140), each of which support one or more virtual machines (depicted in FIG. 1 as virtual machines 142(1)-(N), and referred to in the aggregate as virtual machines 142), which, in turn, each support one or more applications (depicted in FIG. 1 as applications 144(1)-(N), and referred to in the aggregate as applications 144). Also depicted in FIG. 1 are a number of filter drivers (depicted in FIG. 1 as I/O taps 150(1)-(N), and referred to in the aggregate as I/O taps 150). In the manner noted elsewhere herein, I/O taps 150 track information regarding write operations to a primary data storage unit 152, and also passes such information (e.g., metadata) to a data receiver 155 of source data mover 120. In turn, data receiver 155 passes this data and metadata to source data mover (SDM) staging storage 157 as update sets (depicted in FIG. 1 as update sets (USs) 160(N)-(M)), under the control of replication engine 130. Conversely, also under the control of replication engine 130, a source data transceiver 162 sends such update sets from source data mover 122 target data mover 122 via network 105. These update sets are received at target data mover 122 by a target data receiver 164 target data receiver 164 then stores the update sets received (depicted in FIG. 1 as update sets (USs) 160(M−1)-(1)) in target data mover (TDM) staging storage 165. In turn, a data applier 167 retrieves update sets from TDM staging storage 165 and applies those update sets to a secondary data storage unit 170.

Also depicted in FIG. 1 are a number of host computers (depicted in FIG. 1 as host computers 180(1)-(N), and referred to in the aggregate as host computers 180), which support a number of virtual machines (depicted in FIG. 1 as virtual machines 182(1)-(N), and referred to in the aggregate as virtual machines 182). Virtual machines 182, in turn, support one or more applications (depicted in FIG. 1 as applications 184(1)-(N), and referred to in the aggregate as applications 184). Host computers 180, virtual machines 182, and applications 184 are depicted to illustrate a scenario in which one or more virtual machines have been failed over to secondary site 104, as might be the case, for example, were a disaster to befall the infrastructure at primary site 102. As noted earlier, such a situation would result in secondary site 104 becoming the "active" site. In that situation, target data mover 122 would become the source data mover, and sourcing a mover 120 would become target data mover. Also in such a situation, secondary data storage unit 170 would store source data store, while primary data storage unit 152 would store the target data store. In such a situation, then, replication would proceed from secondary site 104 the primary site 102, until such time as the migrated instances were failed back to primary site 102.

It will be noted that the variable identifiers such as those used herein (e.g., "N" and "M") are used to more simply designate the final element of a series of related or similar elements, or identify intermediate ones thereof. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

It will also be appreciated that each of the foregoing components of ITRP architecture 100, as well as alternatives and modifications thereto, are discussed in further detail below and/or will be apparent in view of this disclosure. In this regard, it will be appreciated that the various data storage systems described herein can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, ITRP architecture 100 and/or the various networks thereof can include other components such as routers, firewalls and the like that are not germane to the discussion of the present disclosure and will not be discussed further herein. It will also be appreciated that other configurations are possible.

Figure 2A:
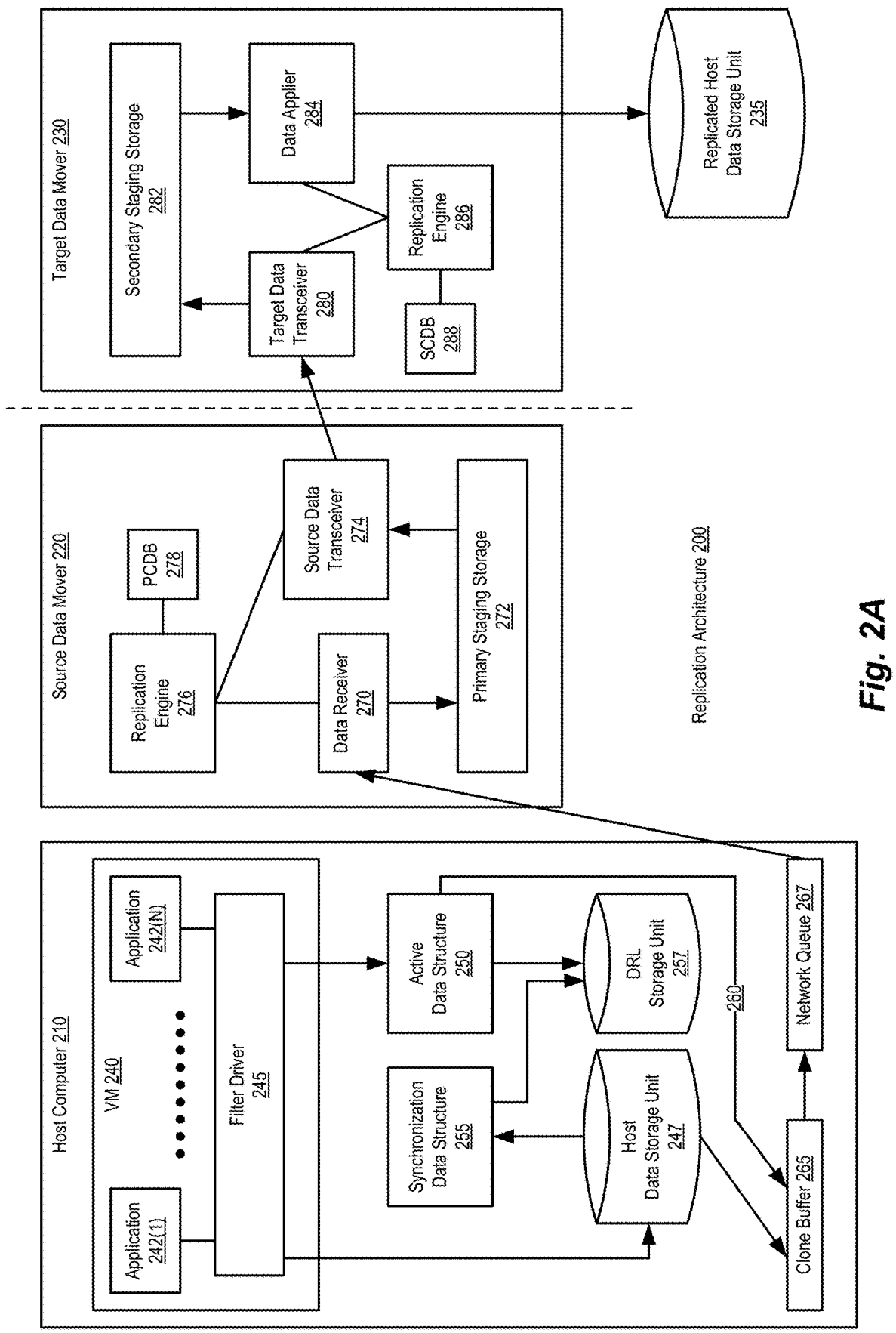
FIG. 2A is a simplified block diagram illustrating an example of certain components, features, and processes of a replication architecture, according to one embodiment.

FIG. 2A is a simplified block diagram illustrating an example of certain components, features, and processes of a replication architecture, according to one embodiment. FIG. 2A thus illustrates a replication architecture 200, which depicts certain of the features of ITRP architecture 100 in greater detail. To this end, FIG. 2A depicts a host computer 210 (e.g., in the manner of one of host computers 140 of FIG. 1) communicatively coupled to a source data mover 220 (e.g., in the manner of source data mover 120 of FIG. 1), which is, in turn, communicatively coupled to a target data mover 230 (e.g., in the manner of target data mover 122 of FIG. 1). Target data mover 230 stores replicated data in a replicated data store such as a replicated host data storage unit 235 (e.g., in the manner of secondary data storage unit 170 of FIG. 1).

Also in the manner of host computers 140 of FIG. 1, host computer 210 supports a virtual machine 240 that, in turn, supports a number of applications (depicted in FIG. 2A as applications 242(1)-(N), and referred to in the aggregate as applications 242, in the manner of applications 144 of FIG. 1) and a filter driver 245 (in the manner of I/O taps 150 of FIG. 1). Filter driver 245 captures information regarding write operations performed by applications 242, and, while shown as being implemented as an in-guest filter driver (I/O tap), can be implemented as a hypervisor-based filter driver to equally advantageous effect, though such may not be possible in implementations employing a third-party hypervisor. The data of such write operations is written to a host data storage unit 247. Information regarding such write operations are also reflected in an active data structure 250. Active data structure 250 is maintained as part of replication operations performed with respect to the data written by applications 242 two host data storage unit 247 during normal replication operations. Also maintained by filter driver 245 is a synchronization data structure 255. Synchronization data structure 255 is employed in synchronization and resynchronization operations (e.g., as between data stored in host data storage unit 247 and replicated host data storage unit 235, as well as the converse according to methods and systems such as those described herein). As is illustrated, active data structure 250 and synchronization data structure 255 are persisted in a DRL storage unit 257. A DRL ("dirty region log") is a storage construct that stores information indicating whether a region of data has been changed (i.e., is "dirty") by a write operation, during some period of time (e.g., during the period of time between a machine being powered-on (initialized) and the point in time at which replication operations are begun).

Data written to host data storage unit 247 and corresponding metadata (including store identifiers and information from active data structure 250, which appear as part of metadata 260) is written to a clone buffer 265. As will be appreciated in light of the present disclosure, data stored to host data storage unit 247 can be written there to and subsequently copied to clone buffer 265, or, in the alternative, written to both host data storage unit 247 and clone buffer 265 substantially simultaneously, as part of the same write operation. Further, it will be appreciated that data stored in a data store in host data storage unit 247 can include all manner of information, including configuration information, one or more files (as might, for example, be stored in a file system), some number of chunks/segments/blocks of data, or other such units of data, which may be quantified in terms of bytes of data, one or more storage disks, one or more storage volumes, or the like. Further, such storage architectures may also be referred to as data storage systems, of which the host data storage unit and the replicated host data storage unit are examples. Data and metadata stored in clone buffer 265 is then transferred to a network queue 267, for forwarding to source data mover 220.

This data and metadata is received by source data mover 220 at a data receiver 270, which stages the data and metadata as update sets in a primary staging storage 272 as update sets. A source data transceiver 274 retrieves these update sets and sends them to target data mover 230. Data receiver 270 and source data transceiver 274 perform these operations under the control of a replication engine 276 that is configured using information in a primary configuration database 278.

The update sets sent by source data mover 220 are received by target data mover 230 at a target data transceiver 280. Target data transceiver 280 stages the update sets thus received in a secondary staging storage 282. A data applier 284 then retrieves these update sets from secondary staging storage 282, and applies the retrieved update sets to replicated host data storage unit 235. Target data transceiver 280 and data applier 284 perform the foregoing operations under the control of a replication engine 286 that is configured using information in a primary configuration database 288.

Figure 2B:
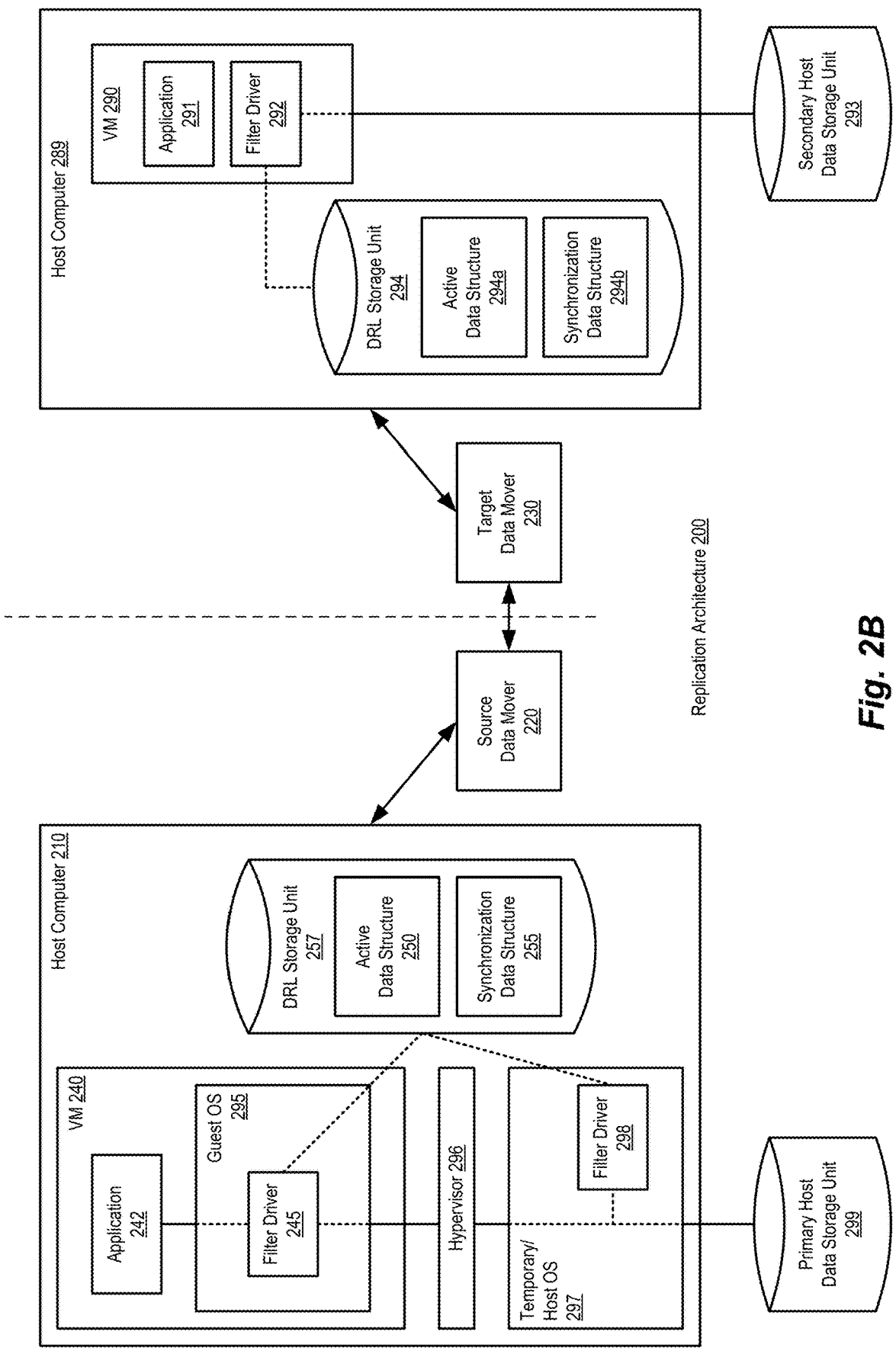
FIG. 2B is a simplified block diagram illustrating an example of certain components, features, and processes of a replication architecture, according to one embodiment.

FIG. 2B is a simplified block diagram illustrating an example of certain other components, features, and processes of a replication architecture, according to one embodiment, in the manner of FIG. 2A. FIG. 2B thus illustrates replication architecture 200, which depicts certain other of the features of ITRP architecture 100 in greater detail. To this end, FIG. 2B depicts various of the components depicted in FIG. 2B, also in greater detail. Replication architecture 200 depicts these components in a state in which virtual machine 240 has been migrated (e.g., as a result of a disaster) to a secondary site, executing on a host computer 289 as virtual machine 290. Similarly, application 242 is now executed by virtual machine 290 as an application 291, the write operations from which are tracked by a filter driver 292, with write operations writing data to a secondary host data storage unit 293. In the manner discussed elsewhere herein, filter driver 292 stores information regarding such write operations in a DRL storage unit 294. Among the information stored DRL storage unit 294 is information regarding write operations stored in an active data structure 294a and a synchronization data structure 294b.

As before, host computer 210 provides for the storage of metadata in DRL storage unit 257, including active data structure 250 and synchronization data structure 255. As noted, replication architecture 200, and more specifically, the computing systems that make up its infrastructure, can support a number of filter drivers, among them filter drivers to 45 and 292. As depicted in FIG. 2B, filter driver 245 is now illustrated as being implemented in a guest operating system (OS) 295. However, as also noted, in the case in which a hypervisor (e.g., such as that depicted in FIG. 2B as a hypervisor 296) is used to manage virtual machines such as virtual machine 240, and provides no support for functionality comparable to that of a filter driver, an operating system (e.g., a host operating system and/or a temporary operating system, an example of which is depicted in FIG. 2B as a temporary/host operating system 297) can implement a filter driver such as a filter driver 298, which can track write operations performed by applications executed by host computer 210, virtual machine 240, or other such computing entities, destined for a target data store (not illustrated) stored in a primary host data storage unit 299. Here again, a filter driver such as filter driver 298 can update data structures stored in DRL storage 257.

In one embodiment, such write tracking can be performed such that filter driver 245 makes updates to active data structure 250, while filter driver 298 makes updates to synchronization data structure 255. Alternatively, all such filter drivers can make updates to a single data structure. In the latter case, use of a single data structure can allow for updates from a variety of sources, and in so doing, produce a single data structure reflecting the relevant information regarding write operations performed.

Regardless of the manner in which these data structures are implemented, in situations such as those described earlier, filter driver 245 and filter driver 298 are able to capture information regarding write operations performed erroneously during such situations. Active data structure 250 and/or synchronization data structure 255, having been maintained in this fashion, can be combined, in order to produce a combined data structure that reflects the write operations tracked by filter drivers 245 and 299. Combining such data structures, using the example of bitmaps, a logical OR operation can be used in order to combine the data structures in a manner that reflects write operations tracked by either of filter driver 245 and/or filter driver 298. This combined data structure can then be sent to the secondary site (now, the source site), where that data structure can be combined with synchronization data structure 294b, in order to ensure that data from the "active" site (the erstwhile secondary site) is sent to the target site, in order for the target site to overwrite the erroneous data written to the target data store in primary host data storage unit 299.

Figure 3:
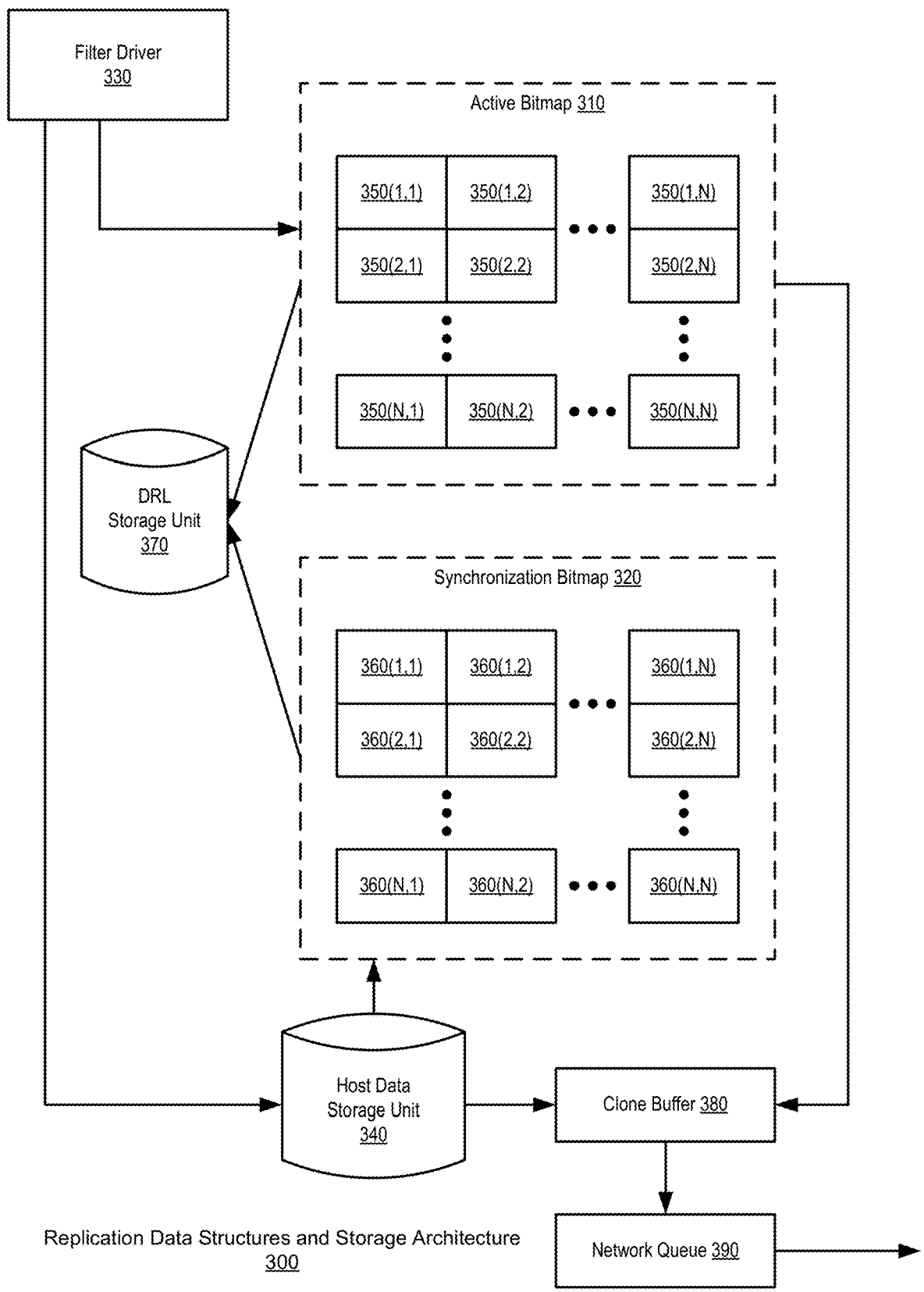
FIG. 3 is a simplified block diagram illustrating an example of certain components of replication data structures and storage, according to one embodiment.

FIG. 3 is a simplified block diagram illustrating an example of certain components of replication data structures and storage, according to one embodiment. FIG. 3 illustrates an implementation of the active and synchronization data structures described earlier. A replication data structures and storage architecture 300 is thus depicted, in which active data structure is implemented as an active bitmap 310, and the synchronization data structure is implemented as a synchronization bitmap 320. As before, a filter driver 330 captures information regarding write operations issued by one or more applications executed by one or more virtual or physical machines. The data of such right operations are passed (e.g., by filter driver 330, or directly from the application(s) in question) to a host data storage unit 340.

Filter driver 310 also stores information regarding the size and location of the data written by such write operations in active bitmap 310, indicating which units of data (regions) had changed ("dirtied"). Such information can be maintained, for example, in a number of bits (depicted in FIG. 3 bits 350(1)-(N), and referred to in the aggregate as bits 350). As is discussed elsewhere herein, bits 350 reflect data changed by write operations during, for example, replication operations.

Similarly, synchronization bitmap 320 maintains information regarding the size and location of data that differs as between source replication storage and target replication storage. Such differences can result from, for example, a virtual machine being initialized for the first time, but can also result from inconsistencies caused by the restoration and/or restart of machines occurring during replication operations. In a fashion similar to active bitmap 310, synchronization bitmap 320 maintains information regarding such discrepancies, for example, in a number of bits thereof (depicted in FIG. 3 bits 360(1)-(N), and referred to in the aggregate as bits 360).

As is depicted in FIG. 3, bits 360 of synchronization bitmap 320 are used during synchronization to identify the units of data in one or more data stores stored in host data storage unit 340 that need to be transmitted to the target system's storage systems (e.g., on a secondary site). Thus, bits 360 of synchronization bitmap 320 identify those units of data (stored in the source data store) that are to be copied during synchronization of a target system's storage systems (target data store) with those of a source storage system, as when a given machine is initialized, or such systems are recovering from a failure or other service interruption.

As before, information in active bitmap 310 and synchronization bitmap 320 are persisted in a DRL storage unit 370. Also as before, in performing replication operation such as those described elsewhere herein, changed data stored in host data storage unit 340 and metadata (e.g., information from active bitmap 310, as well as, possibly, restore identifiers, and other such information) are copied to a clone buffer 380. Data and metadata stored in clone buffer 380 can then be queued for transmission to the source data mover in a network queue 390.

Figure 4:
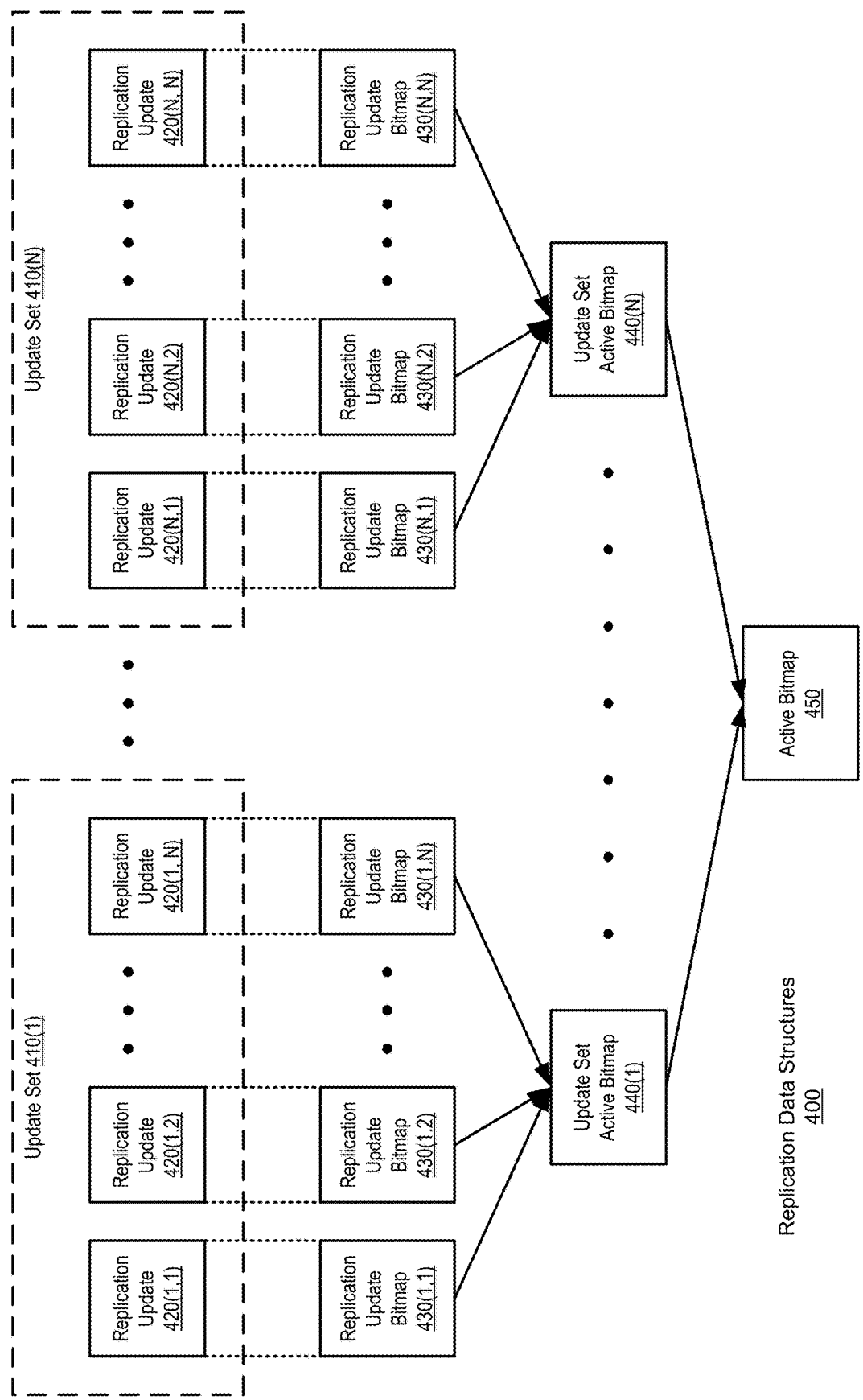
FIG. 4 is a simplified block diagram illustrating an example of certain components of replication data structures and their maintenance, according to one embodiment.

FIG. 4 is a simplified block diagram illustrating an example of certain components of replication data structures and their maintenance, according to one embodiment. FIG. 4 thus illustrates a number of replication data structures 400. Replication data structures 400 can, for example, include a number of update sets (depicted in FIG. 3 as update sets 410(1)-(N), and referred to in the aggregate as update sets 410). In turn, each of update sets 410 includes one or more replication updates (depicted in FIG. 3 as replication updates 420(1,1)-(N,N), and referred to in the aggregate as replication updates 420). In the embodiment depicted in FIG. 4, corresponding to each of replication updates 420 are replication update bitmaps (depicted in FIG. 3 as replication update bitmaps 430(1,1)-(N,N), and referred to in the aggregate as replication update bitmaps 430). In this embodiment, replication update bitmaps 430 include information that represents the location and size of the changes in the source data replicated in replication updates 420. Replication update bitmaps 430 can be combined to form bitmaps for each update set (depicted in FIG. 3 as update set bitmaps 440(1)-(N), and referred to in the aggregate as update set bitmaps 440). In replication data structures 400, such an operation combines replication update bitmaps 430(1,1)-(1,N) to form update set bitmap 440(1), for example. As will be appreciated in light of present disclosure, an update set bitmap such as update set bitmap 440(1) can serve as the active bitmap, though in replication data structures 400, update set bitmaps 440(1)-(N) or combined to form an active bitmap 450. As also will be appreciated in light of present disclosure, a determination as to the persistence of the changes represented by such bitmaps in the intended target system's target data store is dependent, in certain embodiments, on the frequency of the movement of such data and its acknowledgment by the target system. That being the case, such active bitmaps represent data that has been changed at the source system, but has not yet been persisted at the target system. As will also be appreciated, such persistence can involve the clearing of the active bitmap (indicating the persistence of the changes at the target system), upon receipt of an indication that such persistence was successful. Further, it will therefor be appreciated that, in replication data structures 400, update set active bitmaps 440 reflect the state of the corresponding one of update sets 410, while active bitmap 450 is cumulative in nature (given that update sets 410 are received over a period of time).

Example Processes for Data Resynchronization

Figure 5:
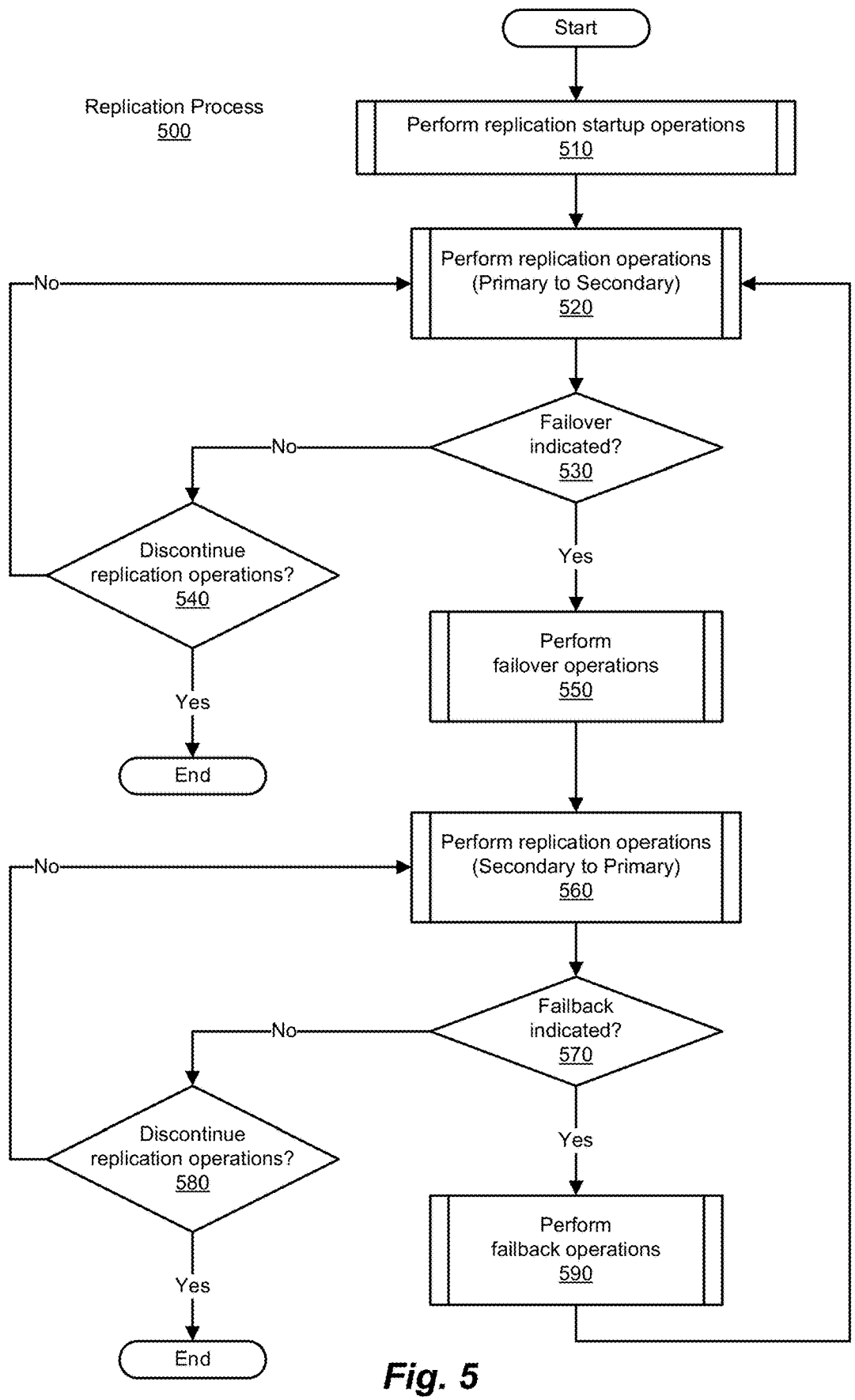
FIG. 5 is a flow diagram illustrating an example of a replication process, according to one embodiment.

FIG. 5 is a flow diagram illustrating an example of a replication process, according to one embodiment. FIG. 5 thus illustrates a replication process 500. Replication process 500 begins with the initialization of a protected machine (e.g., a protected host machine or a virtual machine executed by a protected host machine). Using a virtual machine is an example, replication process 500 begins with replication startup operations being performed (510). An example of the operations that might be performed in replication startup is described in connection with FIG. 6, subsequently.

At this juncture, replication operations from the primary site to the secondary site proceed (520). An example of the operations that might be performed by a replication process is described in connection with FIGS. 8A and 8B, subsequently. These replication operations continue until such time as an event (e.g., a disaster) occurs.

A determination is then made as to whether a scenario in which a failover is to be performed, is indicated (530). In the case in which the situation encountered results in the cessation of replication operations, but is not a disaster for which failover can be performed, a determination is made as to whether replication operations should be discontinued (540). If the circumstances are such that corrections can be made and replication operations resumed, replication process 500 returns to performing such replication operations (520). Alternatively, if the circumstances are unrecoverable, replication process 500 concludes.

If the circumstances encountered indicate that a failover can be performed (530), replication process 500 proceeds with performing such failover operations (550). An example of the operations that might be performed in a failover is described in connection with FIG. 6, subsequently.

Once failover is complete, replication operations can be resumed, with replication being performed from the secondary site (now the "active" or source site) to the primary site (now the target site) (560). As with replication operations performed from the primary site to the secondary site, an example of the operations that might be performed by a replication process is described in connection with FIGS. 8A and 8B, subsequently.

Replication operations from the secondary site to the primary site continue until such time as an event occurs. In a manner similar to that described with regard to failover, a determination is then made as to whether a fail back is indicated (570). In that case, a fail back from the secondary site to the primary site is performed. If a determination is made that the event is not a fail back, a determination is made as to whether replication operations should be discontinued (580). In a manner comparable to that described above, in the case in which the situation encountered results in the cessation of replication operations, but is not a disaster for which failover can be performed, a determination is made as to whether replication operations should be discontinued (580). If the circumstances are such that corrections can be made and replication operations resumed, replication process 500 returns to performing such replication operations (560). Alternatively, if the circumstances are unrecoverable, replication process 500 concludes. In the case in which a fail back operation is indicated, such a fail back operation is performed (590). As with the earlier discussion of the failover operations, an example of the operations that might be performed in a failover is described in connection with FIG. 6, subsequently.

In the flow diagram of FIG. 5, as well as other flow diagrams presented herein, each block represents one or more operations that can be implemented in hardware, software, or a combination thereof. In the context of software, the blocks represent computer-executable instructions that, when executed by one or more processors, cause the processors to perform the stated operations. Generally, such computer-executable instructions can include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes performed as part of the flow diagrams presented herein, as well as discussions of the operations of the block diagrams presented herein, are described with reference to their respective figures, although other models, frameworks, systems and environments may be used to implement these processes.

Figure 6:
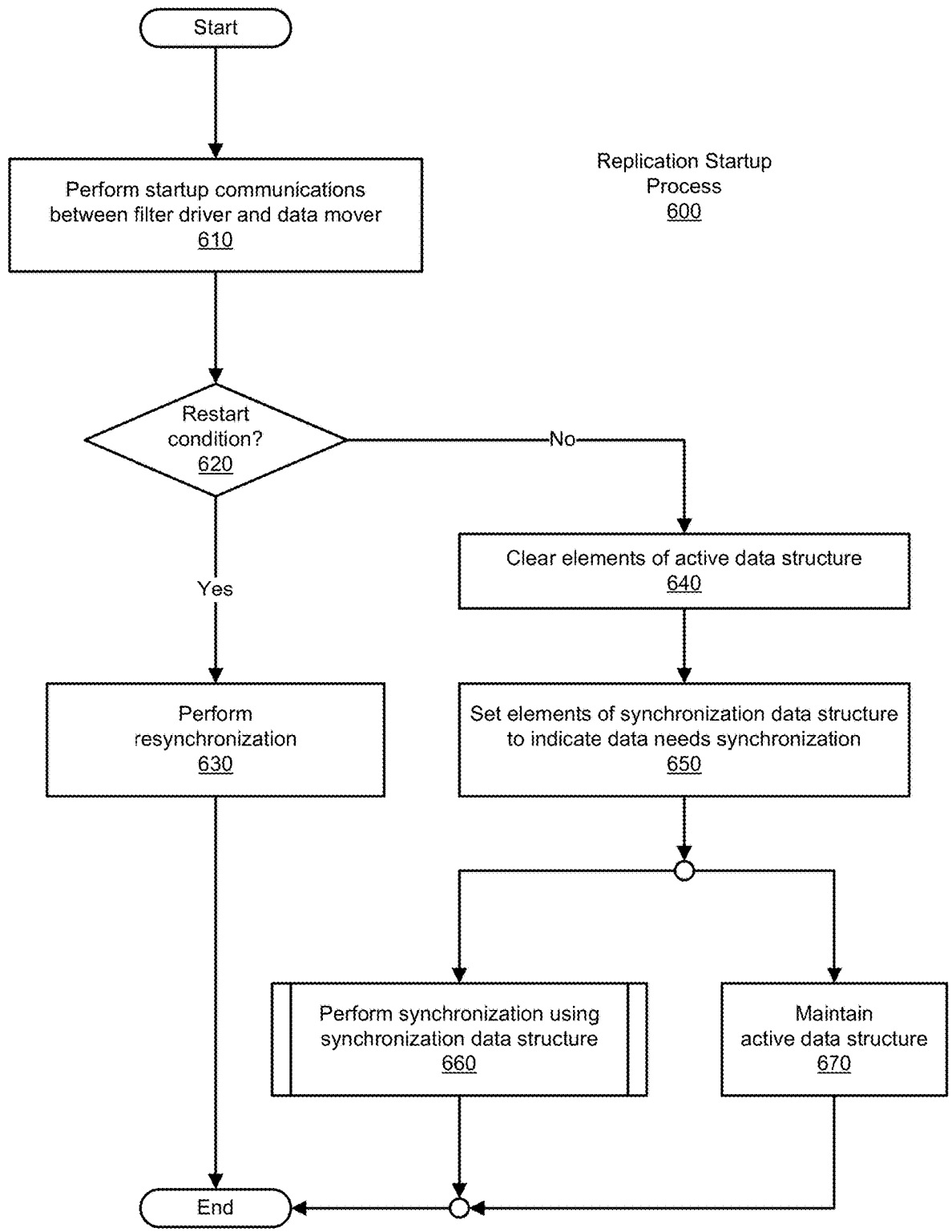
FIG. 6 is a flow diagram illustrating an example of a replication startup process, according to one embodiment.

FIG. 6 is a flow diagram illustrating an example of a replication startup process, according to one embodiment. FIG. 6 thus illustrates a replication startup process 600, such as that described in connection with FIG. 5, previously. Replication startup process 600 begins with startup communications between the given filter driver and its associated data mover (610). In conducting such communications, the filter driver can make a determination as to whether a restart event is indicated by the present conditions (620). As before, such a determination can be based on, for example, information remaining in one or more of the data structures involved, thereby indicating that some amount of target data is no longer in synchronization (consistent) with the corresponding source data. If such is the case, it can be assumed that a startup event such as a restoration or reboot has occurred. If a restart event is determined to have occurred, replication startup process 600 proceeds with performing a resynchronization as between the two sites (630). Replication startup process 600 then concludes.

Alternatively, if a restart condition is not detected, replication startup process 600 proceeds with clearing the elements of the active data structure in question (640). Typically, however, such clearing will not be needed in such a case, given that (in view of the fact that a restart event would not have occurred along this path of execution) the active data structure would not be expected to reflect any write operations. The elements of the appropriate synchronization data structure, however will be set in a manner that indicates that the source data (which will have not been replicated at this juncture) will need to be synchronized (and so copied to the target system's target data store (a full synchronization)) (650).

At this juncture, the aforementioned synchronization is performed using the synchronization data structure in question (660). An example of synchronization operations is described in connection with FIG. 7, subsequently. Substantially simultaneously, in order to capture and replicate write operations that occur during the aforementioned synchronization, the active data structure in question is maintained (670). Replication startup process 600 then concludes. As will be appreciated in light of the present disclosure, however, once the target data store is synchronized with the source data store, the synchronization data structure will ultimately be cleared, and the active data structure will be maintained as normal replication operations proceed. In this regard, completion of synchronization can be done by determining if any elements in synchronization data structure remain in a state that indicates that more data remains to be synchronized (e.g., as by making a determination with respect to whether one or more bits of a synchronization bitmap remain set)

Figure 7:
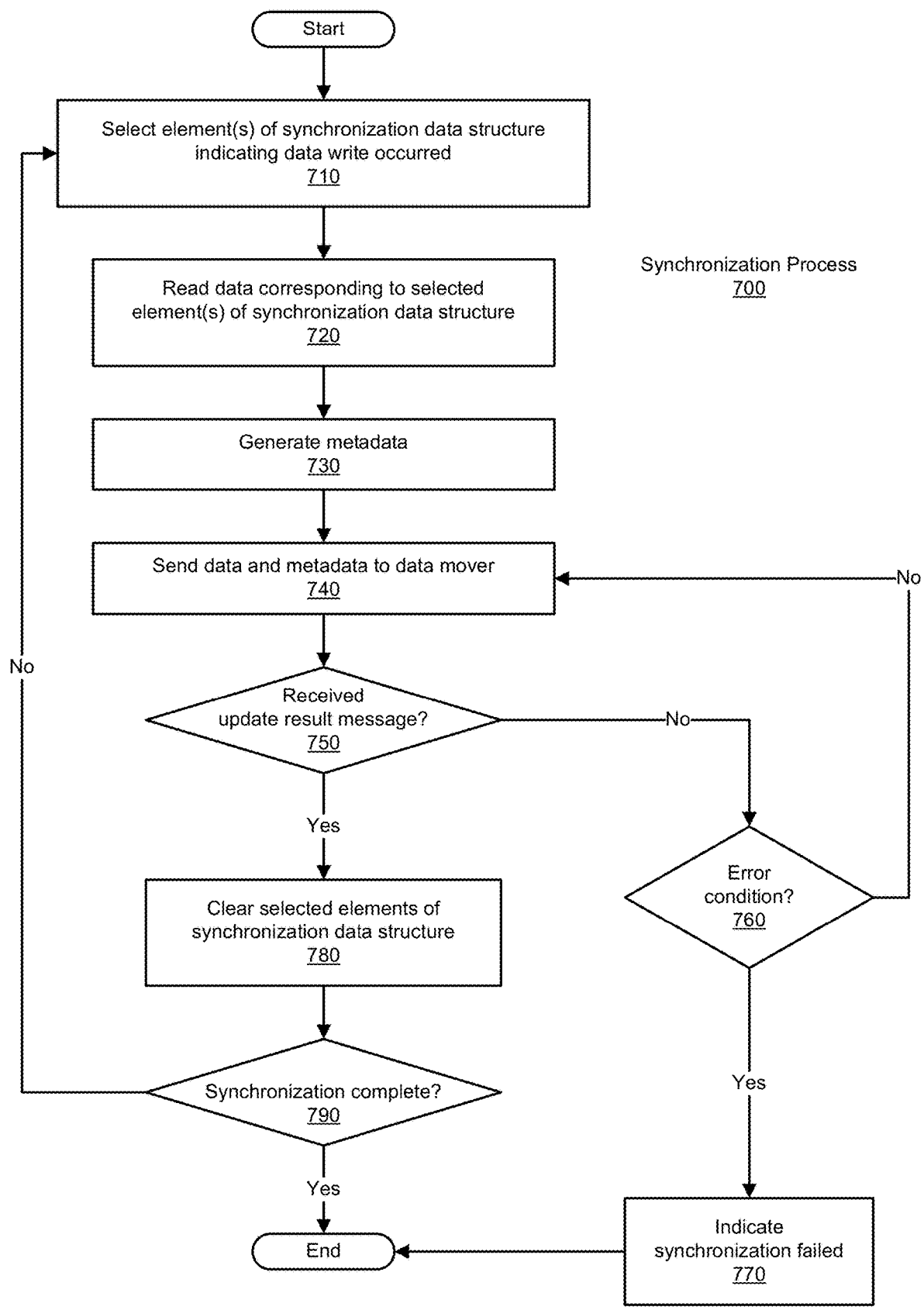
FIG. 7 is a flow diagram illustrating an example of a synchronization process, according to one embodiment.

FIG. 7 is a flow diagram illustrating an example of a synchronization process, according to one embodiment. FIG. 7 thus illustrates a synchronization process 700, in the manner of that described earlier in connection with FIG. 6. Synchronization process 700 begins by selecting one or more elements of the synchronization data structure in question that indicate a write operation has occurred (710). In the examples described herein with regard to the use of bitmaps such indication can be made by setting (e.g., to a binary value of "1") the one or more bits representing the data subject to such a write operation, with regard to their location and extent (with, conversely, bits set to a binary value of "0" representing unchanged data). The units of data corresponding to such selected elements of the synchronization data structure are then read (720). At this juncture, metadata for the source data read is generated (730). Such metadata can include information describing a location of the source data in question, as well as such source data's size.

The data and metadata thus generated are then sent to the source system's data mover (740). A determination is then made as to whether the data and metadata (update result message) was successfully received by the data mover (750). If no such indication is forthcoming, a determination is made as to whether an error has occurred (760). If no air-conditioners occurred, synchronization process 700 resends the data and metadata to the data mover (740). Alternatively, if an error condition has prevented the proper receipt and processing (and so acknowledgment) of the update result message, and indication as to the synchronization having failed is provided (770). Synchronization process 700 then concludes.

In the alternative, if the update result message (including the data and metadata) is successfully received (750), the selected elements of the synchronization data structure are cleared (780), indicating that synchronization of the data in question can be treated as having been successfully accomplished. Next, a determination as to whether synchronization process 700 has completed is made (790). If further data remains to be synchronized, synchronization process 700 loops to the selection of the next element(s) of the synchronization data structure, and synchronization of the target data store with the source data store for those units of data that is indicated proceeds (710). Alternatively, if synchronization process 700 is complete, synchronization process 700 concludes.

Figure 8A:
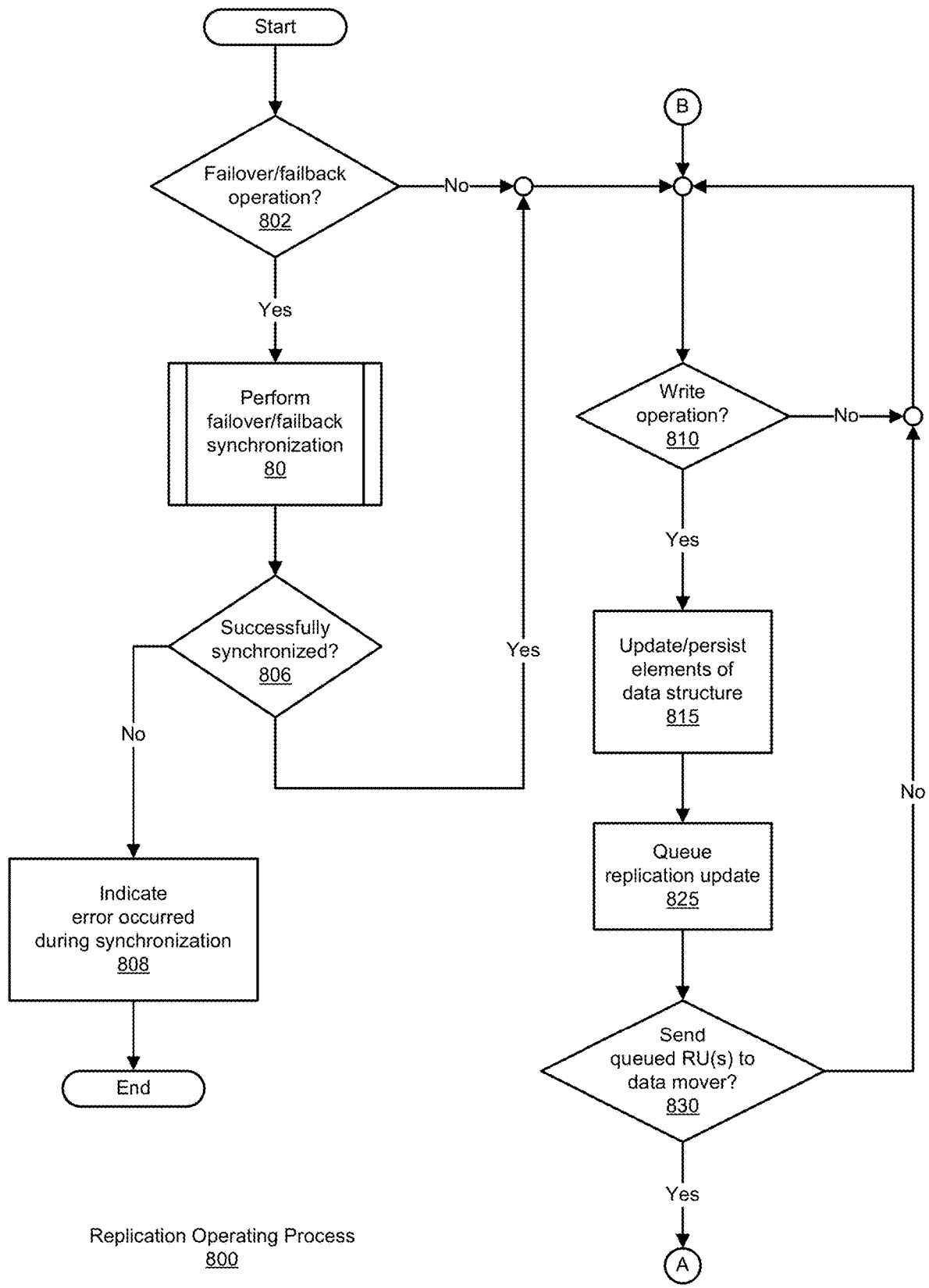
FIGS. 8A and 8B are flow diagrams illustrating an example of a replication operating process, according to one embodiment.
Figure 8B:
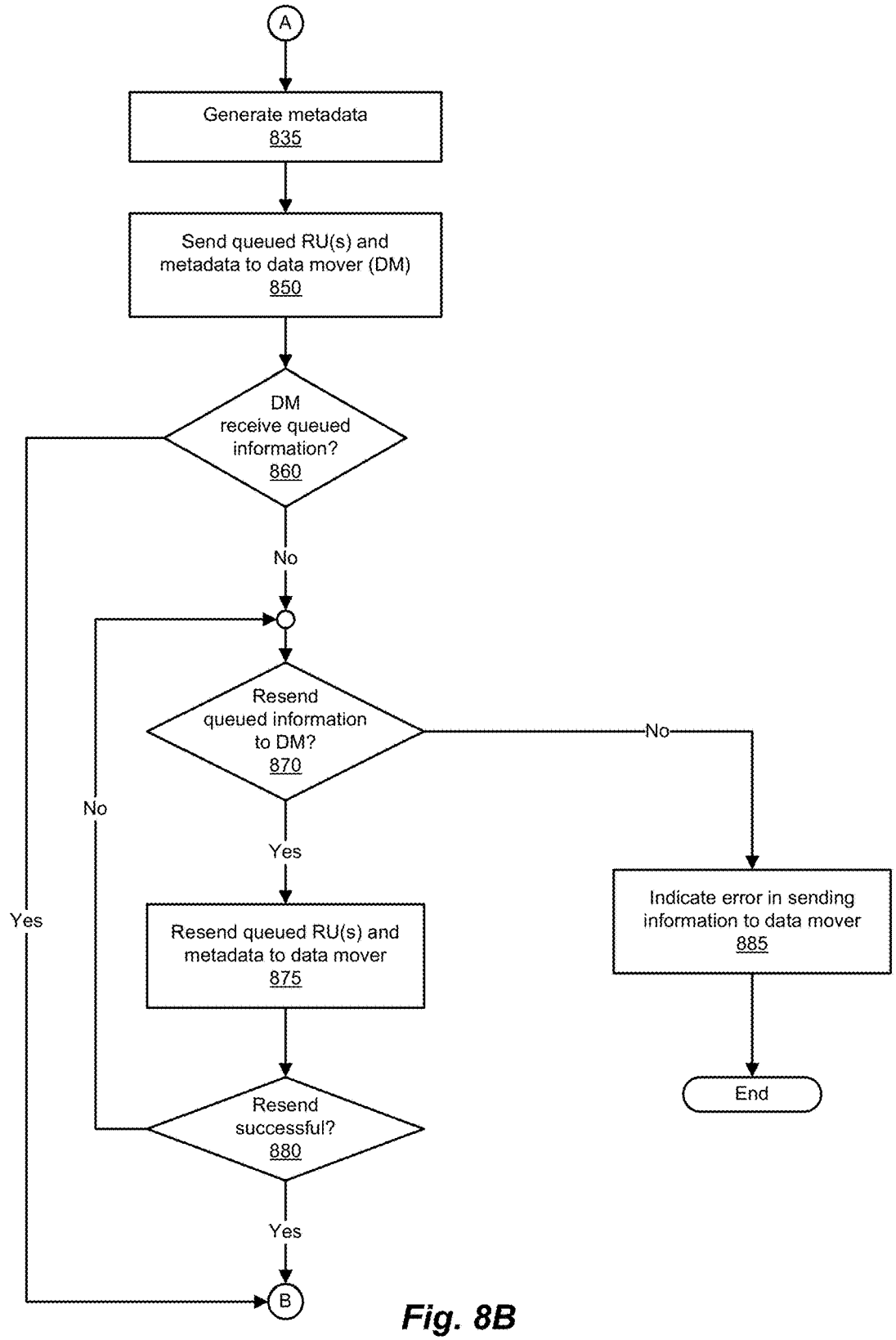

FIGS. 8A and 8B are flow diagrams illustrating an example of a replication operating process, according to one embodiment. FIGS. 8A and 8B thus illustrate a replication operating process 800. Replication operating process 800, as depicted in FIG. 8A, begins with making a determination as to whether a failover or fail back operation has occurred (802). In the case in which a failover or fail back operation has occurred, failover/fail back synchronization is performed, in order to synchronize the target data store in question with its corresponding source data store (804). Once such synchronization is been performed, a determination is made as to whether these synchronization operations were successful (806). If the synchronization operations were not successful, and indication to the effect that an error occurred during synchronization is made (808), and replication operating process 800 concludes.

Alternatively, if the failover/fail back synchronization performed was successful (806) or a failover/fail back operation was not detected (802), replication operating process 800 proceeds to awaiting receipt of a write operation (810). Replication operating process 800 loops until such time as a write operation occurs. Upon receipt of a write operation, one or more elements of the active data structure, corresponding to the location and size of the data written, are updated (815). The present state of the active data structure can then be persisted (e.g., to the source system's DRL storage unit) at this juncture. The replication update thus generated (including the relevant data and metadata) is then queued for transmission to the source data mover by way of, for example, a clone buffer and network queue (825). In certain embodiments, such metadata will include information regarding data that is the subject of the replication update such as a logical block number (LBN), the size of the region of data (e.g., the number of units of data), and a physical block number (PBN). In such an embodiment, when replicating a virtual machine, the logical block number can represent an offset from the beginning of a virtual machine disk (VMDK), while the physical block number can represent a physical location of the data in question in physical storage (e.g., the location of the data in the host data storage unit, and nominally, in the replicated host data storage unit).

Once the replication update in question has been queued, a determination is made as to whether that in any other replication updates in the network queue aridity be sent to the source data mover (830). If additional replication updates are to be queued prior to such transmission (830), replication operating process 800 loops to awaiting the next write operation (810). Replication operating process 800 then continues to FIG. 8B by way of connector "A".

Alternatively, if the requisite number of replication updates have been queued (or the defined period of time has elapsed, or other threshold reached), replication operating process 800 proceeds (to FIG. 8B by way of connector "A") to generating data verification information (835). Such data verification information can include, for example, a checksum for the data of each replication update. As will be described subsequently, such a checksum (and, optionally, other data verification information, such as that described elsewhere herein) can be included in update sets sent from the source system to the target system; subsequently, such data verification information used in making a determination as to whether data in the target data store has ultimately remain unchanged. Such might be the case, for example, if, cumulatively, erroneous write operations were to leave a given unit of data in the target data store, in the same state as that in the source data store (e.g., in the case in which the data in question has been changed, but has been changed back to its original state (and "X-Y-X")). In such a case, the source data mover can make a determination as to such situation, in order to prevent the filter driver from sending data that is the same as that already stored in the target data store.

Next, the queued replication updates and associated metadata (including information such as the aforementioned LBN, size, PBN, data verification information, and other related information) is sent to the source data mover (850).

Replication operating process 800 thus proceeds to a determination as to whether the queued information sent to the data mover has been successfully received (860). If the queued information (replication updates and associated metadata) have been successfully received by the source data mover, the restoration identifier is persisted in the source system's DRL storage unit. In that case, replication operating process 800 then proceeds to FIG. 8A by way of connector "B", at which point (the replication updates and metadata having been successfully received) replication operating process 800 awaits the next write operation (810).

Alternatively, if the source data mover fails to indicate that the queued information was successfully received (860), replication operating process 800 proceeds to a determination as to whether the queued information should be resent to the source data mover (870). If it is determined that the queued information should be resent to the source data mover, the filter driver initiates the resending of the queued information to the source data mover (875). In that case, a determination is then made as to whether the retransmission of the queued information was successful (880). In the case in which the queued information was retransmitted successfully, the restore identifier is persisted, as before (860), and replication operating process 800 returns to clearing the elements of the active data structure and awaiting the next write operation, as before, via connector "B".

If retransmission of the queued information cannot be successfully accomplished (870), replication operating process 800 proceeds to making an indication of this failure (885), and concluding.

Figure 9:
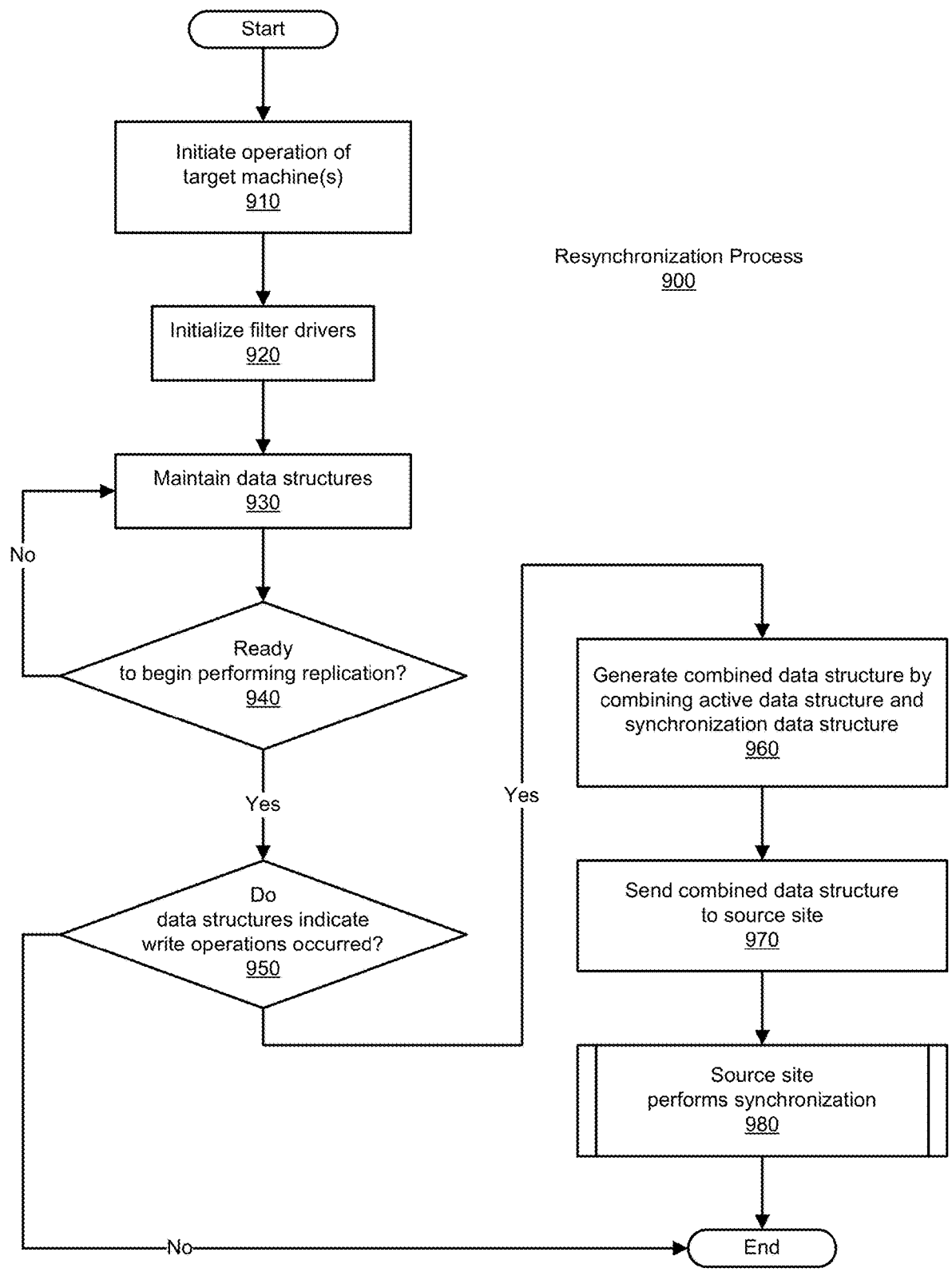
FIG. 9 is a flow diagram illustrating an example of a resynchronization process, according to one embodiment.

FIG. 9 is a flow diagram illustrating an example of a resynchronization process, according to one embodiment. FIG. 9 thus illustrates a resynchronization process 900, such as can be performed in certain embodiments such as those described herein in situations in which the target data in a target data store is erroneously subjected to write operations, and thus would otherwise become unsynchronized with respect to corresponding source data in a source data store. Resynchronization process 900 begins with initiating the operation of one or more target machines (also referred to herein as "powering on," "booting up," or the like) (910). At this juncture, one or more filter drivers are initialized (920). Such filter drivers, as noted elsewhere herein, can be implemented, for example, as part of the virtual machines' guest operating systems, the host operating system(s), and/or a temporary operating system (e.g., loaded using a PXE procedure). Further, as noted elsewhere herein, implementation of filter drivers at the host level (e.g., as by a host or temporary operating system) allow for write operation tracking in the implementations that employ hypervisors that do not support such functionality (e.g., as in the case of third-party hypervisors). Further still, in the alternative, it will be appreciated that, in certain implementations, one or more such filter drivers can be implemented as part of the hypervisor in question. In a practical setting, which of these components provide such functionality will typically be determined by the end-user's choice of components (although support for such functionality at the host level can coexist with such functionality provided at the hypervisor level, either by enabling/disabling such functionality at the host level, as appropriate, or simply by providing such functionality, despite the possibility of duplicated efforts in this regard).

As part of initializing the filter driver's, resynchronization process 900 also initialize the data structures used to maintain information regarding the right operations tracked by the filter drivers (930). A determination is then made as to whether the ITRP in question is ready to begin replication operations (940). Resynchronization process 900 iterates at this point, with the filter drivers maintaining the data structures with respect to any write operations (e.g., erroneous write operations performed by applications, erroneous write operations performed by the operating system to application data, and the like; 930), until such time as the ITRP initiates replication operations.

Once the ITRP indicates that replication operations are to begin, resynchronization process 900 makes a determination as to whether the data structures maintained by the filter drivers indicate that erroneous write operations such as those described earlier have occurred (950). In the case in which it is determined that no such erroneous write operations occurred, resynchronization process 900 simply concludes, as no target data in the target data store needs to be synchronized with source data in the source data store (e.g., as by being overwritten therewith). In the alternative, if one or more elements of one or more of the data structures involved indicates that such erroneous write operations were executed on this target data, resynchronization process 900 proceeds with generating a combined data structure (960). In one embodiment, such a combined data structure is generated by combining, for example, an active data structure and a synchronization data structure using an OR operation. In certain embodiments, then, the elements of the combined data structure can be made to reflect such write operations tracked by filter drivers at one or more of levels (e.g., guest operating system, hypervisor, and/or host/temporary operating system, or other, levels), regardless of the level at which the write operation was tracked (and in certain embodiments, even if the write operation was tracked at multiple levels).

Once the combined structure is generated, the combined data structure is sent to the source site (970), which uses the information to identify source data to be sent to the target site (and so, being received by the target site, used to synchronize target data subjected to erroneous write operations with the corresponding source data), which is accomplished by the source site implementing a synchronization operation (980). An example of synchronization operations was described in connection with FIG. 7, previously. Upon the completion of synchronization using the combined synchronization data structure, resynchronization process 900 concludes.

Figure 10:
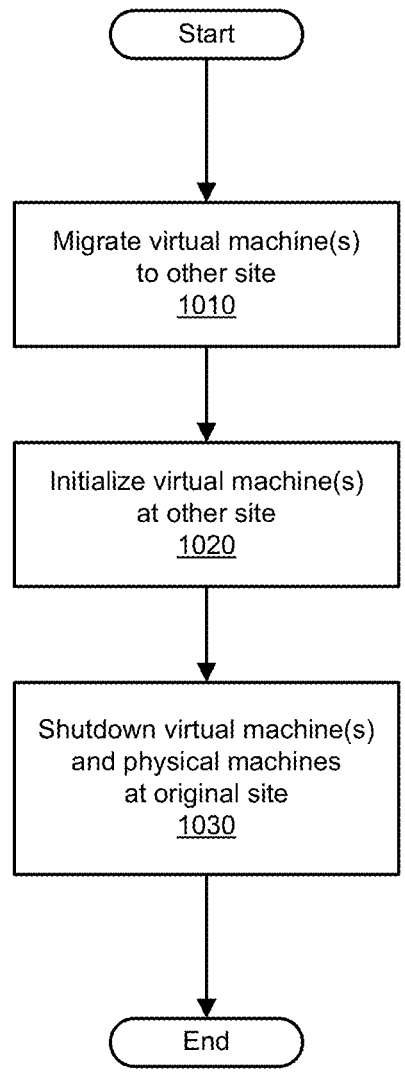
FIG. 10 is a flow diagram illustrating an example of a failover/failback process, according to one embodiment.

FIG. 10 is a flow diagram illustrating an example of a process effecting failover/failback operations, according to one embodiment. FIG. 10 thus illustrates a failover/failback process 1000. Failover/failback process 1000 begins, upon a failure at a source site necessitating such migration, with the migration of one or more virtual machines from the (current) source site to the (current) target site (1010). Such migration operations can be the result of the failure of certain machines (whether physical or virtual), or a more site-wide event (e.g., a natural disaster, site-wide power failure, or other such event). In so doing, the migration operation (at least for the virtual machines involved) results in the (former) source site becoming the (current) target site, and the (former) target site becoming the (current) source site. As will be appreciated, then, from the perspective of primary and secondary sites, the operations presented in failover/failback process 1000 are essentially agnostic as to the direction of former/current replication operations, at least in certain embodiments.

In this vein, the virtual machines in question, as a result of the migration operations, are initialized on the other site (1020). Also as a result thereof, the virtual machines, and potentially, physical machines, at the original site are shut down (1030). Failover/failback process 1000 then concludes.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 11 and 12.

Figure 11:
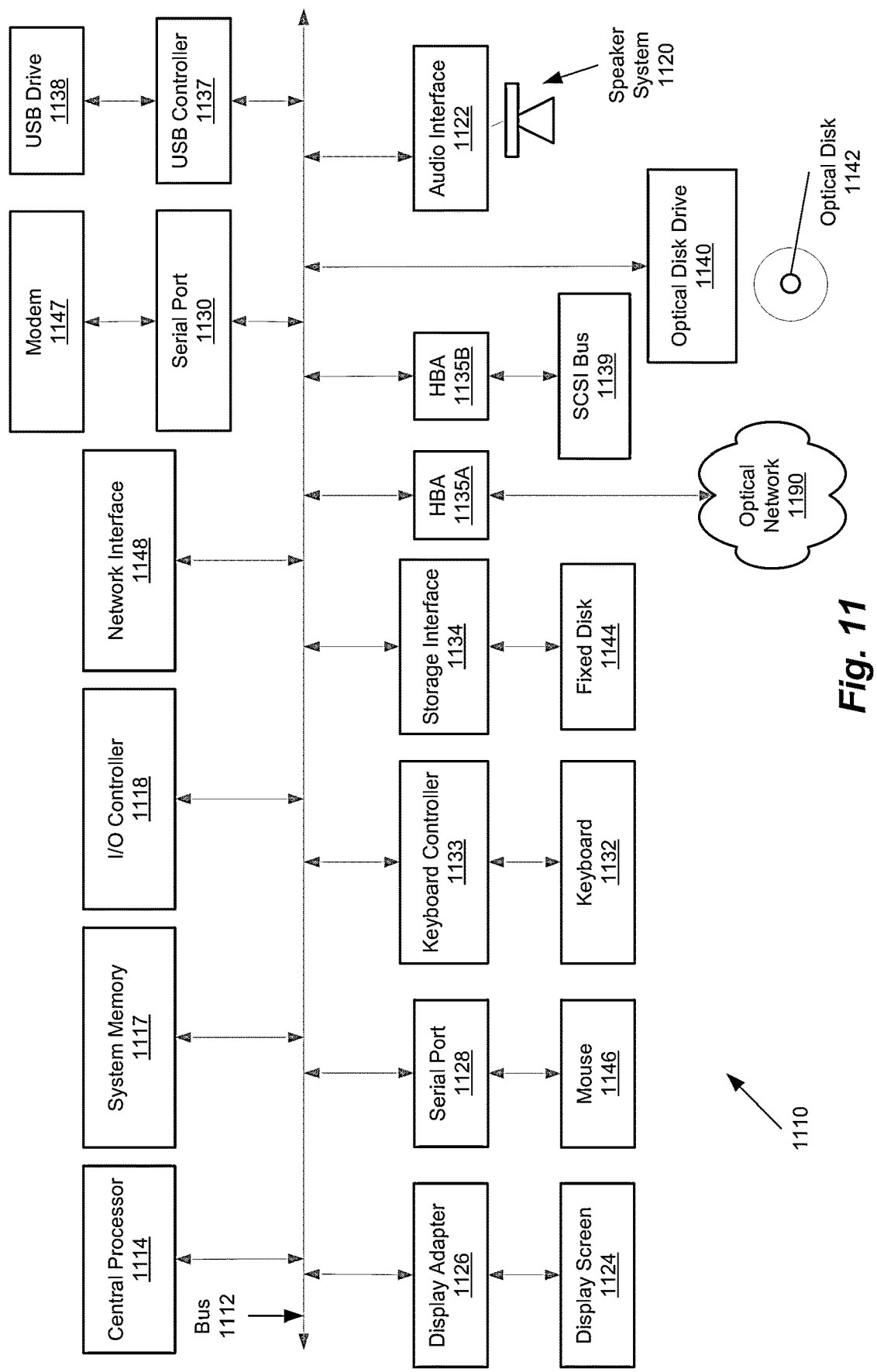
FIG. 11 is a simplified block diagram illustrating components of an example computer system suitable for implementing embodiments of the present disclosure, according to one embodiment.

FIG. 11 depicts a block diagram of a computer system 1110 suitable for implementing aspects of the systems described herein. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a USB controller 1137 operative to receive a USB drive 1138, a host bus adapter (HBA) interface card 1135A operative to connect with a optical network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a universal serial bus (USB) controller 1137, or other computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 will be readily understood in light of the present disclosure. Code to implement portions of the systems described herein can be stored in computer-readable storage media such as one or more of system memory 1117, fixed disk 1144, optical disk 1142, or USB drive 1138. The operating system provided on computer system 1110 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
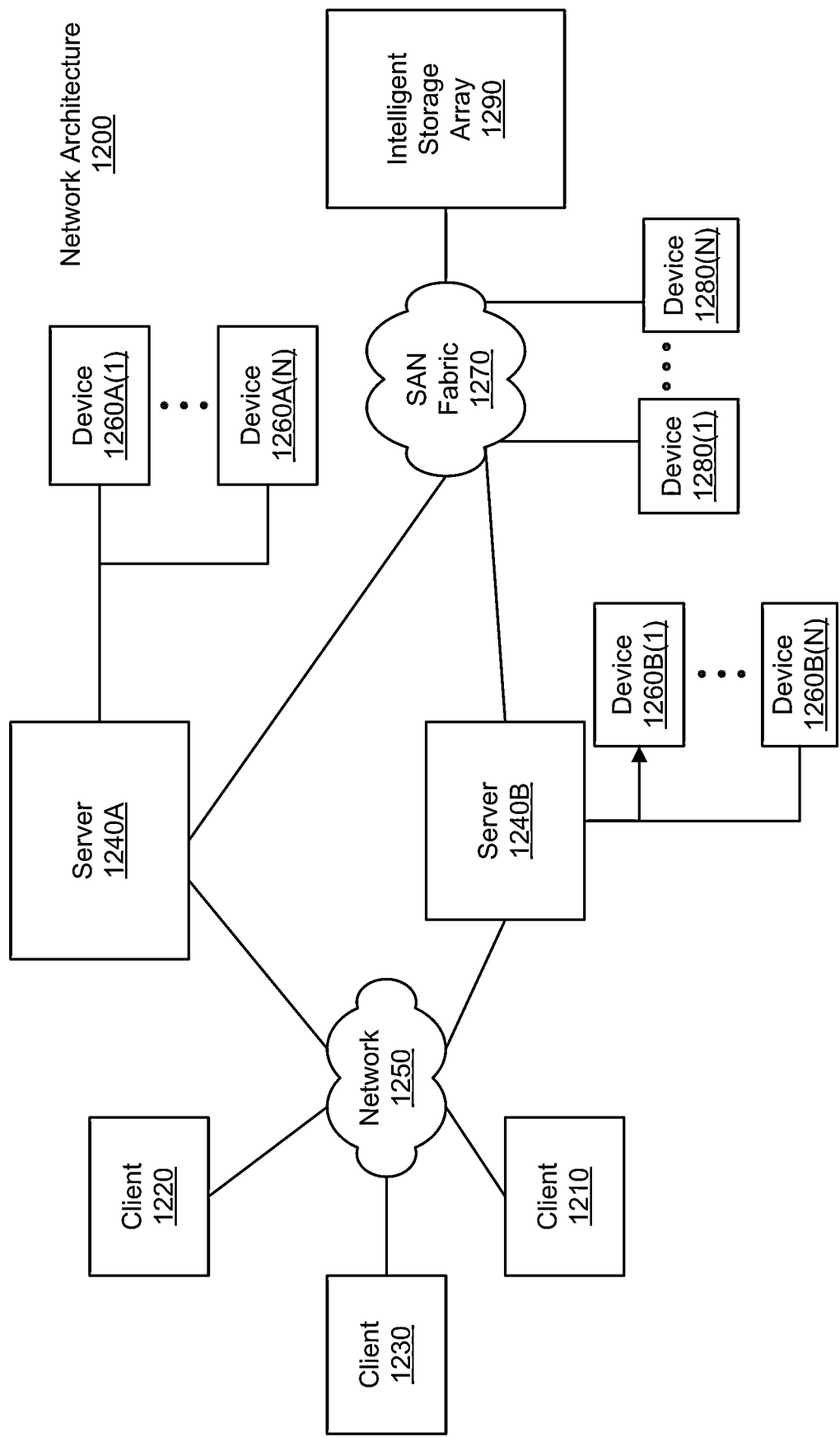
FIG. 12 is a simplified block diagram illustrating components of an example computer system suitable for implementing embodiments of the present disclosure, according to one embodiment.

FIG. 12 is a block diagram depicting a network architecture 1200 in which client systems 1210, 1220 and 1230, as well as storage servers 1240A and 1240B (any of which can be implemented using computer system 1210), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation. SAN fabric 1270 supports access to storage devices 1280(1)-(N) by storage servers 1240A and 1240B, and so by client systems 1210, 1220, and 1230 via network 1250. An intelligent storage array 1290 is also shown as an example of a specific storage device accessible via SAN fabric 1270.

With reference to computer system 1110, modem 1147, network interface 1148, or some other method can be used to provide connectivity from each of client computer systems 1210, 1220 and 1230 to network 1250. Client systems 1210, 1220, and 1230 are able to access information on storage server 1240A or 1240B using, for example, a web browser or other client software (not shown). Such a client allows client systems 1210, 1220 and 1230 to access data hosted by storage server 1240A or 1240B, or one of storage devices 1260A(1)-(N), 1260B(1)-(N), 1280(1)-(N) or intelligent storage array 1290. FIG. 12 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1110). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, at a source site, whether metadata has been received from a target site, wherein
        the source site is a source for a replication operation,
        the target site is a target for the replication operation,
        the replication operation replicates one or more units of source data stored in a source data store at the source site, to a target data store at the target site,
        the metadata comprises information regarding a data structure,
        the data structure identifies at least one unit of the source data that the source site is to provide to the target site as a result of one or more erroneous write operations having been executed on a target data store at the target site,
        execution of the one or more erroneous write operations caused at least one other unit of data to be written to the target data store,
        the one or more erroneous write operations were not executed as part of the replication operation,
        the at least one other unit of data and the at least one unit of the source data are different from one another, and
        the at least one unit of the source data is other than the one or more units of source data; and
    in response to a determination that the metadata has been received at the source site,
        retrieving the at least one unit of the source data from the source data store using the metadata, and
        sending, from the source site, the at least one unit of source data to the target site.

2. The method of claim 1, wherein
    the data structure comprises an active data structure.

3. The method of claim 2, further comprising:
    generating a combined data structure by combining the active data structure and a synchronization data structure, wherein
        the synchronization data structure is maintained at the source site.

4. The method of claim 3, wherein
    the sending sends the combined data structure from the source site to the target site.

5. The method of claim 4, further comprising:
    receiving the at least one unit of source data at the target site; and
    overwriting the one or more units of data with at least one unit of data of the combined data structure.

6. The method of claim 1, further comprising:
    causing a source data mover at the source site to perform a synchronization operation, in response to the determination that the metadata has been received at the source site.

7. The method of claim 5, wherein
    the overwriting is performed
        prior to initiation of the replication operation, or
        as part of the replication operation.

8. The method of claim 1, wherein
    the determining, retrieving, and sending are performed as a result of at least one of a failover operation or a failback operation.

9. The method of claim 8, wherein
    the metadata is received as a result of initiation of the replication operation.

10. The method of claim 1, wherein the metadata further comprises:
    a logical block number,
    a size, and
    a physical block number.

11. A non-transitory computer-readable storage medium, comprising program instructions, which, when executed by one or more processors of a computing system, perform a method comprising:
    determining, at a source site, whether metadata has been received from a target site, wherein
        the source site is a source for a replication operation,
        the target site is a target for the replication operation,
        the replication operation replicates one or more units of source data stored in a source data store at the source site, to a target data store at the target site,
        the metadata comprises information regarding a data structure,
        the data structure identifies at least one unit of the source data that the source site is to provide to the target site as a result of one or more erroneous write operations having been executed on a target data store at the target site,
        execution of the one or more erroneous write operations caused at least one other unit of data to be written to the target data store,
        the one or more erroneous write operations were not executed as part of the replication operation,
        the at least one other unit of data and the at least one unit of the source data are different from one another, and
        the at least one unit of the source data is other than the one or more units of source data; and
    in response to a determination that the metadata has been received at the source site,
        retrieving the at least one unit of the source data from the source data store using the metadata, and
        sending, from the source site, the at least one unit of source data to the target site.

12. The non-transitory computer-readable storage medium of claim 11, wherein the method further comprises:
    generating a combined data structure by combining an active data structure and a synchronization data structure, wherein
        the data structure comprises the active data structure,
        the synchronization data structure is maintained at the source site, and
        the sending sends the combined data structure from the source site to the target site.

13. The non-transitory computer-readable storage medium of claim 11, wherein the method further comprises:
    causing a source data mover at the source site to perform a synchronization operation, in response to the determination that the metadata has been received at the source site.

14. The non-transitory computer-readable storage medium of claim 13, wherein the method further comprises:
  receiving the at least one unit of source data at the target site; and
  overwriting the one or more units of data with the at least one unit of source data.

15. The non-transitory computer-readable storage medium of claim 14, wherein
  the overwriting is performed
    prior to initiation of the replication operation, or
    as part of the replication operation.

16. The non-transitory computer-readable storage medium of claim 11, wherein
  the metadata is received as a result of initiation of the replication operation, and
  the determining, retrieving, and sending are performed as a result of at least one of a failover operation or a failback operation.

17. The non-transitory computer-readable storage medium of claim 11, wherein the metadata further comprises:
  a logical block number,
  a size, and
  a physical block number.

18. A computing system comprising:
  one or more processors; and
  a computer-readable storage medium coupled to the one or more processors, comprising program instructions, which, when executed by the one or more processors, perform a method comprising
    determining, at a source site, whether metadata has been received from a target site, wherein
      the source site is a source for a replication operation,
      the target site is a target for the replication operation,
      the replication operation replicates one or more units of source data stored in a source data store at the source site, to a target data store at the target site,
      the metadata comprises information regarding a data structure,
      the data structure identifies at least one unit of the source data that the source site is to provide to the target site as a result of one or more erroneous write operations having been executed on a target data store at the target site,
      execution of the one or more erroneous write operations caused at least one other unit of data to be written to the target data store,
      the one or more erroneous write operations were not executed as part of the replication operation,
      the at least one other unit of data and the at least one unit of the source data are different from one another, and
      the at least one unit of the source data is other than the one or more units of source data, and
    in response to a determination that the metadata has been received at the source site,
      retrieving the at least one unit of the source data from the source data store using the metadata, and
      sending, from the source site, the at least one unit of source data to the target site.

19. The computing system of claim 18, the method further comprising:
  generating a combined data structure by combining an active data structure and a synchronization data structure, wherein
    the data structure comprises the active data structure,
    the synchronization data structure is maintained at the source site, and
    the sending sends the combined data structure from the source site to the target site.

20. The computing system of claim 18, wherein
  receiving the at least one unit of source data at the target site; and
  overwriting the one or more units of data with the at least one unit of source data.

* * * * *